United States Patent
Inoue et al.

(10) Patent No.: US 10,040,916 B2
(45) Date of Patent: Aug. 7, 2018

(54) FUNCTIONAL POLYMER MEMBRANE AND METHOD FOR PRODUCING SAME

(71) Applicant: FUJIFILM Corporation, Tokyo (JP)

(72) Inventors: Kazuomi Inoue, Kanagawa (JP); Keisuke Kodama, Kanagawa (JP); Sotaro Inomata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 15/254,520

(22) Filed: Sep. 1, 2016

(65) Prior Publication Data
US 2016/0369073 A1 Dec. 22, 2016

Related U.S. Application Data

(63) Continuation of application No. PCT/JP2015/058382, filed on Mar. 19, 2015.

(30) Foreign Application Priority Data

Mar. 25, 2014 (JP) ................................. 2014-062799

(51) Int. Cl.
C08J 5/22 (2006.01)
H01M 8/22 (2006.01)
(Continued)

(52) U.S. Cl.
CPC .......... *C08J 5/2231* (2013.01); *B01D 53/228* (2013.01); *B01D 61/42* (2013.01); *B01D 67/0006* (2013.01); *B01D 69/02* (2013.01); *B01D 69/125* (2013.01); *B01D 71/28* (2013.01); *B01J 41/14* (2013.01); *B01J 47/12* (2013.01); *C08F 2/50* (2013.01); *C08F 12/28* (2013.01); *C08F 12/34* (2013.01); *H01M 2/162* (2013.01); *H01M 8/0239* (2013.01); *H01M 8/102* (2013.01); *H01M 8/103* (2013.01); *H01M 8/1023* (2013.01); *H01M 8/1072* (2013.01); *H01M 8/227* (2013.01); *B01D 2323/12* (2013.01); *B01D 2323/30* (2013.01); *B01D 2323/34* (2013.01); *B01D 2325/04* (2013.01);
(Continued)

(58) Field of Classification Search
None
See application file for complete search history.

(56) References Cited

U.S. PATENT DOCUMENTS 5,118,717 A 6/1992 Hodgdon et al.

FOREIGN PATENT DOCUMENTS

| JP | 2006-083342 A | 3/2006 |
| JP | 2006-206633 A | 8/2006 |
| JP | 2008-222843 A | 9/2008 |

OTHER PUBLICATIONS

Janovic et al ("Synthesis and Crosslinking Polymerization of some Vinyl-Benzyl-N-Quaternary Salts", Croatica Chemica Acta, vol. 51 (1), p. 93-96. (Year: 1978).*
(Continued)

*Primary Examiner* — Sin J Lee
(74) *Attorney, Agent, or Firm* — Sughrue Mion, PLLC

(57) ABSTRACT

Provided is a functional polymer membrane having a structure represented by the following Formula (1) and a structure represented by the following Formula (2), in which an ion exchange capacity is 2.0 meq/g to 7.0 meq/g; and a method for producing the same, $$-S-LL^1-LL-LL^2-S-$$ Formula (1)

in Formula (1), LL represents a single bond or an alkylene group which may have a substituent, —O—, —S—, —NR$^Z$— or a linking group obtained by combining these, LL$^1$ and LL$^2$ represent —(CR$^1$R$^2$)$_l$— or —(CR$^1$R$^2$)$_l$—C(=O)O— (in which the atom bonded to LL is an oxygen atom), R$^1$ and R$^2$ represent a hydrogen atom or an alkyl group, l represents 1 or 2, R$^Z$ represents a hydrogen atom or a substituent, however, in a case where terminal atoms of a substituent in LL and a substituent of R$^Z$ are a sulfur atom, LL is the sulfur atom having a bond to be incorporated into the polymer chain, and Formula (2)

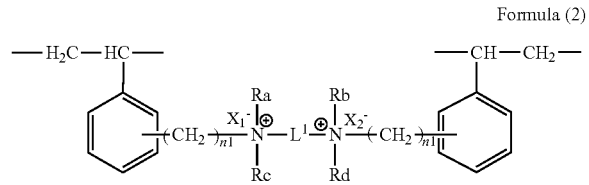

in Formula (2), L$^1$ represents an alkylene group or an alkenylene group, Ra, Rb, Rc, and Rd each independently represent an alkyl group or an aryl group, Ra and Rb, or/and Rc and Rd may be bonded to each other to form a ring, n1 represents an integer of 1 to 10, and X$_1^-$ and X$_2^-$ each independently represent an organic or inorganic anion.

12 Claims, 1 Drawing Sheet

(51) Int. Cl.

| | |
|---|---|
| *H01M 8/1072* | (2016.01) |
| *H01M 8/102* | (2016.01) |
| *H01M 8/0239* | (2016.01) |
| *H01M 8/1023* | (2016.01) |
| *H01M 8/103* | (2016.01) |
| *H01M 2/16* | (2006.01) |
| *C08F 2/50* | (2006.01) |
| *C08F 12/28* | (2006.01) |
| *C08F 12/34* | (2006.01) |
| *B01D 67/00* | (2006.01) |
| *B01D 69/12* | (2006.01) |
| *B01D 69/02* | (2006.01) |
| *B01D 61/42* | (2006.01) |
| *B01D 53/22* | (2006.01) |
| *B01D 71/28* | (2006.01) |
| *B01J 47/12* | (2017.01) |
| *B01J 41/14* | (2006.01) |
| *H01M 8/1018* | (2016.01) |

(52) U.S. Cl.
CPC ....... *B01D 2325/42* (2013.01); *C08J 2325/06* (2013.01); *C08J 2325/18* (2013.01); *H01M 2008/1095* (2013.01); *Y02P 70/56* (2015.11)

(56) References Cited

OTHER PUBLICATIONS

International Search Report of PCT/JP2015/058382 dated May 19, 2015.

* cited by examiner

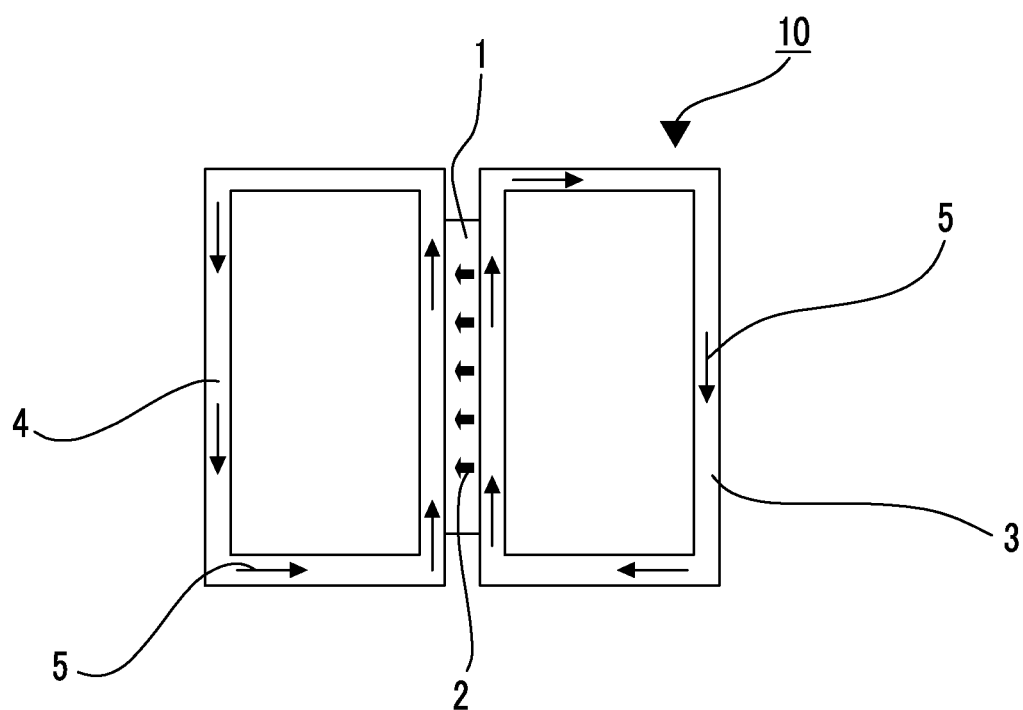

FUNCTIONAL POLYMER MEMBRANE AND METHOD FOR PRODUCING SAME

CROSS-REFERENCE TO RELATED APPLICATIONS

This application is a Continuation of PCT International Application No. PCT/JP2015/058382 filed on Mar. 19, 2015, which claims priority under 35 U.S.C. § 119(a) to Japanese Patent Application No. 2014-062799 filed in Japan on Mar. 25, 2014. Each of the above applications is hereby expressly incorporated by reference, in its entirety, into the present application.

BACKGROUND OF THE INVENTION

1. Field of the Invention

The present invention relates to a functional polymer membrane and a method for producing the same.

2. Description of the Related Art

Regarding a functional polymer membrane having various functions, an ion-exchange membrane, a reverse osmosis membrane, a forward osmosis membrane, or a gas separation membrane are known.

For example, an ion-exchange membrane has been used for electrodeionization (EDI), continuous electrodeionization (CEDI), electrodialysis (ED), electrodialysis reversal (EDR), and the like.

Production examples of various ion-exchange membranes have been reported. In addition, in the production of ion-exchange membranes, the use of a chain transfer agent to enhance the membrane forming properties has also been proposed. For example, JP2006-206633A discloses a method for producing an ion-exchange membrane made of a styrene monomer by using 2,4-diphenyl-4-methyl-1-pentene as a chain transfer agent. Further, JP2006-83342A discloses a method for producing a cation-exchange membrane made of a perfluorocarbon monomer/a perfluoroolefin copolymer having a sulfo group by using a saturated hydrocarbon as a chain transfer agent.

SUMMARY OF THE INVENTION

A membrane forming properties is enhanced by using 2,4-diphenyl-4-methyl-1-pentene and a saturated hydrocarbon as a chain transfer agent for the polymerization-curing reaction. However, in particular, in the case of using the styrene-based monomer, it takes a long time for polymerization-curing, and improvements in large quantity production are needed.

Moreover, in conventional ion-exchange membranes, the electrical resistance of the membrane is increased when lowering the coefficient of water permeability. On the other hand, the lower the electrical resistance of the membrane is, the higher the coefficient of water permeability is. Therefore, in order to further improve the performance of the functional polymer membrane, it is important to lower the coefficient of water permeability and also to lower the electrical resistance of the membrane. However, the degree of technical difficulty rises. Therefore, the present inventors have conducted an investigation on the possibility of considering the coefficient of water permeability and the electrical resistance of the membrane as a whole and generally decreasing the balance of these. In other words, the inventors have considered lowering the product of the coefficient of water permeability and the electrical resistance of the membrane. By means of this, it can be expected that there would be reduction in energy required for electrodialysis.

Accordingly, an object of the invention is to develop means for reducing the electrical resistance of the membrane and the coefficient of water permeability as a whole, thereby providing a functional polymer membrane having an excellent performance as an ion-exchange membrane; and a method for producing the same. Furthermore, an another object of the invention is to provide a method for producing a functional polymer membrane which is appropriate for large quantity production by shortening the polymerization-curing time.

The present inventors have investigated various kinds of styrene-based ion-exchange membrane in order to lower the product of the coefficient of water permeability and the electrical resistance of the membrane. In particular, a case where functional site of the chain transfer agent where at least two places was examined further as a key. As a result, they found that a chain transfer agent in which a functional group is a mercapto group may be means which can lower the product of the coefficient of water permeability and the electrical resistance of the membrane and be effective in solving the objects of the invention. Moreover, they found that the time required for polymerization-curing can be shortened and improvements needed for large quantity production can be achieved by polymerization-curing a composition containing the chain transfer agent in which a functional group is a mercapto group under particular polymerization conditions. The invention has been made based on these findings.

That is, the objects of the invention are achieved by the following means.

<1> A functional polymer membrane comprising: a structure represented by the following Formula (1) and a structure represented by the following Formula (2), in which an ion exchange capacity is 2.0 meq/g to 7.0 meq/g.

—S-LL$^1$-LL-LL$^2$-S—                Formula (1)

In Formula (1), LL represents a single bond or an alkylene group which may have a substituent, —O—, —S—, —NR$^Z$—, or a linking group obtained by combining these, and LL$^1$ and LL$^2$ each independently represent —(CR$^1$R$^2$)$_r$— or —(CR$^1$R$^2$)$_r$—C(=O)O— (in which the atom bonded to LL is an oxygen atom), R$^1$ and R$^2$ each independently represent a hydrogen atom or an alkyl group, l represents 1 or 2, and R$^Z$ represents a hydrogen atom or a substituent, however, in a case where terminal atoms of a substituent in LL and a substituent of R$^Z$ are a sulfur atom, LL is the sulfur atom having a bond to be incorporated into the polymer chain.

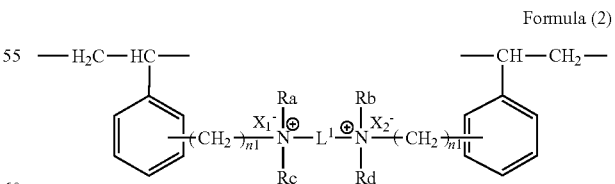

Formula (2)

In Formula (2), L$^1$ represents an alkylene group or an alkenylene group, Ra, Rb, Rc, and Rd each independently represent an alkyl group or an aryl group, Ra and Rb, or/and Rc and Rd may be bonded to each other to form a ring, n1 represents an integer of 1 to 10, and X$_1^-$ and X$_2^-$ each independently represent an organic or inorganic anion.

<2> The functional polymer membrane according to <1>, in which the content of the structure section represented by Formula (1) is 0.01 parts by mass to 10 parts by mass with respect to a total 100 parts by mass of the functional polymer membrane.

<3> The functional polymer membrane according to <1> or <2> obtained by polymerization-curing reaction of a composition containing a (A) styrene-based monomer represented by the following Formula (HSM), a (B) crosslinking agent represented by the following Formula (CL), and a (C) chain transfer agent represented by the following Formula (3).

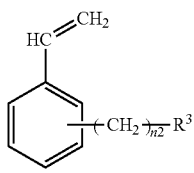

Formula (HSM)

In Formula (HSM), $R^3$ represents a halogen atom or $-N^+(R^4)(R^5)(R^6)(X_3^-)$, and n2 represents an integer of 1 to 10, where $R^4$ to $R^6$ each independently represent a linear or branched alkyl group or aryl group, $R^4$ and $R^5$, or $R^4$, $R^5$, and $R^6$ may be bonded to one another to form an aliphatic hetero ring, and $X_3^-$ represents an organic or inorganic anion.

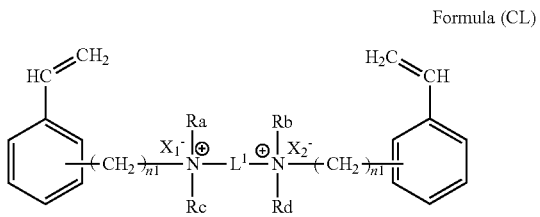

Formula (CL)

In Formula (CL), $L^1$ represents an alkylene group or an alkenylene group, Ra, Rb, Rc, and Rd each independently represent an alkyl group or an aryl group, Ra and Rb, or/and Rc and Rd may be bonded to each other to form a ring, n1 represents an integer of 1 to 10, and $X_1^-$ and $X_2^-$ each independently represent an organic or inorganic anion.

H—S-LL$^1$-LL$^a$-LL$^2$-S—H   Formula (3)

In Formula (3), LL$^a$ represent a single bond or an alkylene group which may have a substituent, —O—, —S—, —NR$^{Za}$—, or a linking group obtained by combining these, LL$^1$ and LL$^2$ each independently represent —(CR$^1$R$^2$)$_l$— or —(CR$^1$R$^2$)$_l$—C(=O)O— (in which the atom bonded to LL$^a$ is an oxygen atom), $R^1$ and $R^2$ each independently represent a hydrogen atom or an alkyl group, l represents 1 or 2, R$^{Za}$ represents a hydrogen atom or a substituent, however, in a case where terminal atoms of a substituent in LL$^a$ and a substituent of R$^{Za}$ are a sulfur atom, LL$^a$ is SH.

<4> The functional polymer membrane according to <3>, in which the composition further contains a (D) polymerization initiator represented by the following Formula (PI-1) or (PI-2);

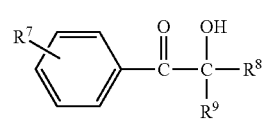

Formula (PI-1)

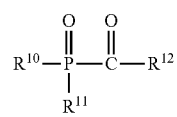

Formula (PI-2)

In Formula (PI-1), $R^7$ represents a hydrogen atom, an alkyl group, an alkenyl group, an alkoxy group, or an aryloxy group, $R^8$ and $R^9$ each independently represent a hydrogen atom, an alkyl group, an alkenyl group, an alkoxy group, or an aryloxy group, and $R^8$ and $R^9$ may be bonded to each other to form a ring.

In Formula (PI-2), $R^{10}$ represents an alkyl group, an aryl group, an alkylthio group, or an arylthio group, $R^{11}$ represents an alkyl group, an aryl group, an alkylthio group, an arylthio group, or an acyl group, and $R^{12}$ represents an alkyl group or an aryl group.

<5> The functional polymer membrane according to <3> or <4>, in which the content of the (A) styrene-based monomer represented by Formula (HSM) is 1 part by mass to 85 parts by mass with respect to 100 parts by mass of the total solid content of the composition.

<6> The functional polymer membrane according to any one of <3> to <5>, in which the content of the (B) crosslinking agent represented by Formula (CL) is 10 parts by mass to 100 parts by mass with respect to 100 parts by mass of the total solid content of the composition.

<7> The functional polymer membrane according to any one of <3> to <6>, in which the content of the (C) chain transfer agent represented by Formula (3) is 0.01 parts by mass to 10 parts by mass with respect to 100 parts by mass of the total solid content of the composition.

<8> The functional polymer membrane according to any one of <3> to <7>, in which the composition contains a (F) solvent.

<9> The functional polymer membrane according to <8>, in which the (F) solvent is water or a water-soluble solvent.

<10> The functional polymer membrane according to any one of <1> to <9>, further comprising synthetic woven fabric, synthetic nonwoven fabric, a sponge-like film, or a film-like support having fine through-holes.

<11> The functional polymer membrane according to any one of <3> to <10>, in which the polymerization-curing reaction is conducted by heating and/or energy ray irradiation.

<12> A method for producing a functional polymer membrane comprising: conducting a polymerization-curing reaction of a composition containing the (A) styrene-based monomer represented by the following Formula (HSM), the (B) crosslinking agent represented by the following Formula (CL) and the (C) chain transfer agent represented by the following Formula (3), in which the ion exchange capacity of the functional polymer membrane is 2.0 meq/g to 7.0 meq/g.

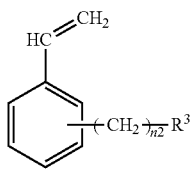

Formula (HSM)

In Formula (HSM), $R^3$ represents a halogen atom or $-N^+(R^4)(R^5)(R^6)(X_3^-)$, and n2 represents an integer of 1 to 10, where $R^4$ to $R^6$ each independently represent a linear or branched alkyl group or aryl group, $R^4$ and $R^5$, or $R^4$, $R^5$, and $R^6$ may be bonded to one another to form an aliphatic hetero ring, and $X_3^-$ represents an organic or inorganic anion.

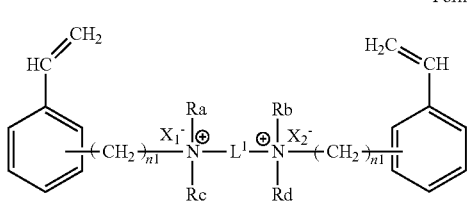

Formula (CL)

In Formula (CL), $L^1$ represents an alkylene group or an alkenylene group, Ra, Rb, Rc, and Rd each independently represent an alkyl group or an aryl group, Ra and Rb, or/and Rc and Rd may be bonded to each other to form a ring, n1 represents an integer of 1 to 10, and $X_1^-$ and $X_2^-$ each independently represent an organic or inorganic anion.

Formula (3)

In Formula (3), $LL^a$ represent a single bond or an alkylene group which may have a substituent, $-O-$, $-S-$, $-NR^{Za}-$, or a linking group obtained by combining these, $LL^1$ and $LL^2$ each independently represent $-(CR^1R^2)_l-$ or $-(CR^1R^2)_l-C(=O)O-$ (in which the atom bonded to $LL^a$ is an oxygen atom), $R^1$ and $R^2$ each independently represent a hydrogen atom or an alkyl group, l represents 1 or 2, $R^{Za}$ represents a hydrogen atom or a substituent, however, in a case where terminal atoms of a substituent in $LL^a$ and a substituent of $R^{Za}$ are a sulfur atom, $LL^a$ is SH.

According to the present specification, "(a value) to (a value)" is used to mean that the values shown before and after "to" are included as the lower limit and the upper limit.

Furthermore, in each of the formulae, unless particularly stated otherwise, in a case in which there are plural groups represented by the same reference symbol, these may be identical to or different from each other. Similarly, in a case in which there are repetitions of plural partial structures, this is intended to mean both that these repetitions are identical repetitions, and that these repetitions are mixtures of different repetitions within a defined range.

Each group as defined in each of the formulae, unless particularly stated otherwise, may further have a substituent, for example, in the case of an alkyl group or an aryl group, this is intended to mean that the alkyl group may have a substituent, and the aryl group may have a substituent.

Furthermore, in regard to geometric isomers, which represent substitution styles of double bonds in each of the formulae, even if only one isomer is described for the convenience of indication, unless particularly stated otherwise, isomers may be an E-form or a Z-form, or may be a mixture thereof.

Further, when the term "compound" is used at the end of words in the present specification, or when specific compounds are indicated by its name or formula, if a dissociable partial structure is present in its chemical formula, a compound means including its salts and ions, in addition to the compound itself. Also, when the term "group" is used at the end of words with respect to a substituent in the present specification, or when a specific compound is indicated by its name, this means that the group or compound may have an substituent.

According to the invention, means capable of lowering the coefficient of water permeability and the electrical resistance of a membrane as a whole has been developed, and as a result, the energy required for electrodialysis or the like can be reduced. When this means is used, a functional polymer membrane having excellent performance as an ion-exchange membrane, and a method for producing the functional polymer membrane can be provided. Moreover, the polymerization-curing time can be shortened, and the method for producing the functional polymer membrane appropriate for large quantity production can be provided.

The above-described features and advantages as well as other features and advantages of the invention will be further disclosed from the descriptions given below, with appropriate reference to the attached drawings.

BRIEF DESCRIPTION OF THE DRAWINGS

FIG. 1 is a schematic diagram illustrating the flow channels of an apparatus for measuring the coefficient of water permeability of a membrane.

DESCRIPTION OF THE PREFERRED EMBODIMENTS

<<Functional Polymer Membrane>>

The functional polymer membrane (In the present specification, a functional polymer membrane is simply referred to as "a membrane") of the invention may be used in order to perform ion exchange, reverse osmosis, forward osmosis, gas separation, and the like. Hereinafter, the preferred embodiments of the invention will be explained by taking an example of a case in which the functional polymer membrane has a function as an anion-exchange membrane.

<Ion Exchange Capacity>

In the case where the functional polymer membrane of the invention has a membrane or a support, the ion exchange capacity is 2.0 meq/g to 7.0 meq/g based on the total dry mass of any of the porous reinforcing material such as a membrane and a porous support. Here, the meq is milliequivalent.

The ion exchange capacity in the invention is preferably 2.2 meq/g to 7.0 meq/g, more preferably 2.5 meq/g to 7.0 meq/g, and even more preferably 3.0 meq/g to 7.0 meq/g.

<Product of Coefficient of Water Permeability and Electrical Resistance of Membrane>

It is preferable that the coefficient of water permeability and the electrical resistance of the membrane are both lower.

In this invention, neither the coefficient of water permeability nor the electrical resistance of the membrane is dealt with alone, and a balance is achieved between the decrease in the coefficient of water permeability and the decrease in the electrical resistance of the membrane, as practical means. Therefore, a comparison of the value of the product of the coefficient of water permeability and the electrical resistance of the membrane is effective as an evaluation standard.

It is preferable that the value of the product of the coefficient of water permeability and the electrical resistance of the membrane [($\Omega \cdot cm^2$)·($mL/m^2/Pa/hr$)] is lower. In the invention, the value is preferably $5.5 \times 10^{-5}$ or less, more preferably $5.1 \times 10^{-5}$ or less, and particularly preferably $5.0 \times 10^{-5}$ or less. Moreover, the lower limit is not particularly limited, but $1 \times 10^{-5}$ or more is practical.

In the invention, since the value of the product of the coefficient of water permeability and the electrical resistance of the membrane is lowered by using the chain transfer agent represented by Formula (3) of the invention, even though the same crosslinking agents are used, it is effective means to reduce the value of the product of the coefficient of water permeability and the electrical resistance of the membrane.

Further, the coefficient of water permeability can be measured by a method that was carried out in Examples.

The electrical resistance of the membrane can be measured by, for example, the method described in Membrane Science, 319, 217-218 (2008), written by NAKAGAKI, Masayuki, Maku-gaku Jikken-ho (Membranology Experimental Methods), pp. 193-195 (1984).

<Selective Permeability>

The selective permeability for anions such as Cl⁻ of the functional polymer membrane (anion-exchange membrane) of the invention is preferably more than 0.90, more preferably more than 0.93, and even more preferably more than 0.95, and it is particularly preferable that the selective permeability value is closer to the theoretical value of 1.0.

<Swelling Ratio>

The swelling ratio (dimensional change rate caused by swelling) of the functional polymer membrane of the invention in water is preferably less than 30%, more preferably less than 15%, and particularly preferably less than 8%. The swelling ratio can be controlled by selecting polymerization-curing conditions in the polymerization-curing stage.

<Measurement Method of Selective Permeability and Swelling Ratio in Water>

Selective permeability and swelling ratio % in water can be measured by, for example, the method described in Membrane Science, 319, 217-218 (2008), written by NAKAGAKI, Masayuki, Maku-gaku Jikken-ho (Membranology Experimental Methods), pp. 193-195 (1984) similar to the electrical resistance of the film.

<Thickness of Membrane>

It is preferable that the functional polymer membrane of the invention is an anion-exchange membrane.

In the case of having a support, the thickness of the membrane of the invention with the support is preferably 30 μm to 250 μm, more preferably 40 μm to 200 μm, and particularly preferably 50 μm to 150 μm.

Here, the thickness of the membrane of the invention is specifically the membrane thickness of a functional polymer membrane that has been stored for at least 12 hours in a 0.1 M NaCl solution, as implemented in the Examples.

<Mass Average Molecular Weight>

The mass average molecular weight of the polymer that constitutes the functional polymer membrane of the invention is hundreds of thousands or more because three-dimensional crosslinks have been formed, and the mass average molecular weight substantially cannot be measured. Generally, the mass average molecular weight of the polymer is regarded to be infinite.

<Structure of Functional Polymer Membrane>

The functional polymer membrane of the invention has at least a structure represented by the following Formula (1) and a structure represented by the following Formula (2).

First, a structure represented by Formula (1) will be described.

   Formula (1)

In Formula (1), LL represents a single bond or an alkylene group which may have a substituent, —O—, —S—, —NR$^Z$—, or a linking group obtained by combining these, LL$^1$ and LL$^2$ each independently represent —(CR$^1$R$^2$)$_I$— or —(CR$^1$R$^2$)$_I$—C(=O)O— (in which the atom bonded to LL is an oxygen atom), R$^1$ and R$^2$ each independently represent a hydrogen atom or an alkyl group, I represents 1 or 2, R$^Z$ represents a hydrogen atom or a substituent, however, in a case where terminal atoms of a substituent in LL and a substituent of R$^Z$ are a sulfur atom, LL is the sulfur atom having a bond to be incorporated into the polymer chain constituting the functional polymer membrane.

The alkylene group for LL may preferably have 1 to 12 carbon atoms and more preferably 1 to 8 carbon atoms, and examples thereof include methylene, ethylene, propylene, isopropylene, tetramethylene, hexamethylene, octamethylene, decamethylene, and dodecamethylene.

The substituent for R$^Z$ may be a monovalent substituent or may be a polyvalent substituent. However, in the case of a polyvalent substituent, the terminal (an atom having a bond other than the bond bonded to the nitrogen atom) of the substituent is a sulfur atom, that is, —S—. As a monovalent substituent, an alkyl group and an aryl group are preferred and as a polyvalent substituent, a divalent substituent is preferred. As a divalent substituent, -alkylene-S— and -arylene-S— are preferred, -alkylene-S— is more preferred, —(CH$_2$)$_2$—S— and —(CH$_2$)$_3$—S— are even more preferred, and —(CH$_2$)$_2$—S— is particularly preferred.

The substituent for R$^Z$ has preferably 1 to 12 carbon atoms, more preferably 1 to 10 carbon atoms, and even more preferably 1 to 6 carbon atoms.

As a linking group in which an alkylene group which may have a substituent, —O—, —S—, —NR$^Z$— are combined, for LL, alkylene-O-alkylene, alkylene-S-alkylene, and -alkylene-NR$^Z$-alkylene are exemplified, and as these alkylene, ethylene, and propylene are preferred, and ethylene is more preferred.

Examples of the substituent which the alkylene may have include the Substituent Group α to be described below, among others, an alkyl group and a hydroxy group are exemplified. Here, a substituent may be a polyvalent substituent, and preferred examples thereof include —CH$_2$C(=O)O—(CR$^1$R$^2$)$_I$—X and —CH$_2$O—CH$_2$C[CH$_2$C(=O)O—(CR$^1$R$^2$)$_I$—X]$_3$. Here, R$^1$, R$^2$, and I have the same meanings as R$^1$, R$^2$, and I in LL$^1$ and LL$^2$, and preferred ranges thereof are also the same. X represents a hydrogen atom, SH, or S—.

I for LL$^1$ and LL$^2$ represents 1 or 2, R$^1$ and R$^2$ each independently represent a hydrogen atom or alkyl group. Here, the alkyl group may have preferably 1 to 10 carbon atoms, more preferably 1 to 6 carbon atoms, even more preferably 1 or 2 carbon atoms, and particularly preferably 1 carbon atom.

$R^1$ and $R^2$ are particularly preferably a hydrogen atom or methyl, and a hydrogen atom is most preferred.

I represents 1 or 2, and is preferably 2.

A structure represented by Formula (1) is preferably a structure represented by the following Formula (1A).

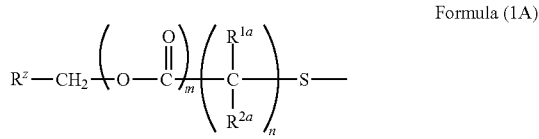

Formula (1A)

In Formula (1A), $R^Z$ represents —S— or -*$CR^{3a}R^{4a}R^{5a}$. * represents a carbon atom bonded to the carbon atom of methylene, and $R^{3a}$, $R^{4a}$, and $R^{5a}$ each independently represent a non-substituted alkyl group, —$CH_2OH$, -$CH_2$(OC=O)$_m$(CR$^{1a}$R$^{2a}$)$_n$S—, or -$CH_2OCH_2C[CH_2$(OC=O)$_m$(CR$^{1a}$R$^{2a}$)$_n$S—]$_3$. ** represents a carbon atom bonded to the *C. However, when $R^Z$ is not —S—, not all of $R^{3a}$ to $R^{5a}$ is a non-substituted alkyl group or —$CH_2OH$. $R^{1a}$ and $R^{2a}$ each independently represent a hydrogen atom, an alkyl group, or a hydroxy group. However, in the case where n is 2 or more, $R^{1a}$ and $R^{2a}$ on the carbon atom bonded to the sulfur atom are a hydrogen atom or an alkyl group. m represents 0 or 1, and n represents an integer of 1 to 12.

The alkyl group for $R^{1a}$ and $R^{2a}$ has the same meanings as the alkyl group in Formula (1), and preferred ranges thereof are also the same, but ethyl is particularly preferred.

n is preferably 2 to 6, and is particularly preferably 4.

Next, a structure represented by Formula (2) will be described.

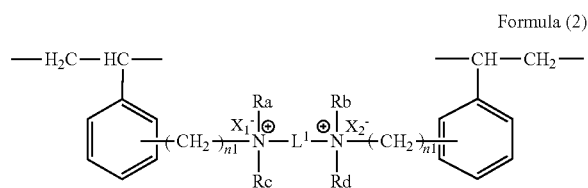

Formula (2)

In Formula (2), $L^1$ represents an alkylene group or an alkenylene group, Ra, Rb, Rc, and Rd each independently represent an alkyl group or an aryl group, Ra and Rb, or/and Re and Rd may be bonded to each other to form a ring, n1 represents an integer of 1 to 10, and $X_1^-$ and $X_2^-$ each independently represent an organic or inorganic anion.

The alkylene group for $L^1$ preferably has 2 or 3 carbon atoms, and examples thereof preferably include ethylene and propylene. The alkylene group may have a substituent, and examples of the substituent include any of the substituents selected from the Substituent Group α to be described later.

The alkenylene group for $L^1$ has preferably 2 or 3 carbon atoms, more preferably 2 carbon atoms, and particularly preferably an ethenylene group.

The alkyl group for Ra, Rb, Rc, and Rd preferably has 1 to 8 carbon atoms, more preferably 1 to 4 carbon atoms, and even more preferably 1 or 2 carbon atoms. Examples of the alkyl group include methyl, ethyl, isopropyl, n-butyl, and 2-ethylhexyl. The alkyl group may have a substituent, and examples of the substituent include any of the substituents selected from the Substituent Group α to be described later.

The aryl group for Ra, Rb, Rc, and Rd has preferably 6 to 12 carbon atoms, more preferably 6 to 10 carbon atoms, and even more preferably 6 to 8 carbon atoms. The aryl group may have a substituent, and examples of the substituent include any of the substituents selected from the Substituent Group α to be described later. The aryl group is preferably a phenyl group.

Among them, Ra, Rb, Rc, and Rd are preferably an alkyl group, and is particularly preferably methyl.

Ra and Rb or/and Rc and Rd may be respectively bonded to each other to form a ring.

Ra and Rb are preferably bonded to each other to form a piperazine ring or dihydropyradine ring with $L^1$, or in addition to Ra and Rb, Rc, and Rd are particularly preferably bonded to each other to form a triethylenediamine ring (1,4-diazabicyclo[2.2.2]octane ring) with $L^1$. Further, the formed ring may have a substituent, and examples of the substituent include any of the substituents selected from the Substituent Group α to be described later. Among them, the alkyl group is preferred.

n1 is preferably 1 or 2, and is particularly preferably 1.

$X_1^-$ and $X_2^-$ represent an organic or inorganic anion, and an inorganic anion is preferred.

Examples of the organic anion include an alkylsulfonic acid anion, an arylsulfonic acid anion, and an alkyl or arylcarboxylic acid anion, and examples thereof include a methanesulfonic acid anion, a benzenesulfonic acid anion, a toluenesulfonic acid anion, and an acetic acid anion.

Examples of the inorganic anion include a halogen anion, a sulfuric acid dianion, and a phosphoric acid anion, and a halogen anion is preferred. Among halogen anions, a chloride anion and a bromide anion are preferred, and a chloride anion is particularly preferred.

<Content of Specific Structure>

In the invention, the content of the structure section represented by Formula (1) is preferably 0.01 parts by mass to 10 parts by mass, more preferably 0.05 parts by mass to 10 parts by mass, even more preferably 0.05 parts by mass to 5 parts by mass, and particularly preferably 0.2 parts by mass to 3 parts by mass with respect to the total 100 parts by mass of the functional polymer membrane.

Further, in the invention, the content of the structure section represented by Formula (2) is preferably 10 parts by mass to 100 parts by mass, more preferably 15 parts by mass to 90 parts by mass, and particularly preferably 20 parts by mass to 80 parts by mass with respect to a total 100 parts by mass of the functional polymer membrane.

Here, the Substituent Group α will be explained

The Substituent Group α is a group of substituents composed of the following substituents.

(Substituent Group α)

As the Substituent Group α, an alkyl group (preferably an alkyl group having 1 to 30 carbon atoms, more preferably 1 to 20 carbon atoms, and particularly preferably 1 to 10 carbon atoms, and examples thereof include methyl, ethyl, isopropyl, t-butyl, n-octyl, 2-ethylhexyl, n-decyl, and n-hexadecyl), a cycloalkyl group (preferably a cycloalkyl group having 3 to 30 carbon atoms, more preferably 3 to 20 carbon atoms, and particularly preferably 3 to 10 carbon atoms, and examples thereof include cyclopropyl, cyclopentyl, and cyclohexyl), an alkenyl group (preferably an alkenyl group having 2 to 30 carbon atoms, more preferably 2 to 20 carbon atoms, and particularly preferably 2 to 10 carbon atoms, and examples thereof include vinyl, allyl, 2-butenyl, and 3-pentenyl), an alkynyl group (preferably an alkynyl group having 2 to 30 carbon atoms, more preferably 2 to 20 carbon atoms, and particularly preferably 2 to 10 carbon atoms, and examples thereof include propargyl and 3-pentynyl), an aryl group (preferably an aryl group having 6 to 30 carbon atoms, more preferably 6 to 20 carbon atoms, and particularly preferably 6 to 12 carbon atoms, and examples thereof include phenyl, p-methylphenyl, naphthyl, and anthranyl), an amino group (including an amino group, an alkylamino group, and an arylamino group; the amino group is preferably an amino group having 0 to 30 carbon atoms, more preferably 0 to 20 carbon atoms, and particularly preferably 0 to 10 carbon atoms, and examples thereof include amino, methylamino, dimethylamino, diethylamino, dibenzylamino, diphenylamino, and ditolylamino), an alkoxy group (preferably an alkoxy group having 1 to 30 carbon atoms, more preferably 1 to 20 carbon atoms, and particularly preferably 1 to 10 carbon atoms, and examples thereof include methoxy, ethoxy, butoxy, and 2-ethylhexyloxy), an aryloxy group (preferably an aryloxy group having 6 to 30 carbon atoms, more preferably 6 to 20 carbon atoms, and particularly preferably 6 to 12 carbon atoms, and examples thereof include phenyloxy, 1-naphthyloxy, and 2-naphthyloxy), a heterocyclic oxy group (preferably a heterocyclic oxy group having 2 to 30 carbon atoms, more preferably 2 to 20 carbon atoms, and particularly preferably 2 to 12 carbon atoms, and examples thereof include pyridyloxy, pyrazyloxy, pyrimidyloxy, and quinolyloxy), an acyl group (preferably an acyl group having 1 to 30 carbon atoms, more preferably 1 to 20 carbon atoms, and particularly preferably 1 to 12 carbon atoms, and examples thereof include acetyl, benzoyl, formyl, and pivaloyl), an alkoxycarbonyl group (preferably an alkoxycarbonyl group having 2 to 30 carbon atoms, more preferably 2 to 20 carbon atoms, and particularly preferably 2 to 12 carbon atoms, and examples thereof include methoxycarbonyl and ethoxycarbonyl), an aryloxycarbonyl group (preferably an aryloxycarbonyl group having 7 to 30 carbon atoms, more preferably 7 to 20 carbon atoms, and particularly preferably 7 to 12 carbon atoms, and examples thereof include phenyloxycarbonyl), an acyloxy group (preferably an acyloxy group having 2 to 30 carbon atoms, more preferably 2 to 20 carbon atoms, and particularly 2 to 10 carbon atoms, and examples thereof include acetoxy and benzoyloxy), an acylamino group (preferably an acylamino group having 2 to 30 carbon atoms, more preferably 2 to 20 carbon atoms, and particularly preferably 2 to 10 carbon atoms, and examples thereof include acetylamino and benzoylamino), an alkoxycarbonylamino group (preferably an alkoxycarbonylamino group having 2 to 30 carbon atoms, more preferably 2 to 20 carbon atoms, and particularly preferably 2 to 12 carbon atoms, and examples thereof include methoxycarbonylamino), an aryloxycarbonylamino group (preferably an aryloxycarbonylamino group having 7 to 30 carbon atoms, more preferably 7 to 20 carbon atoms, and particularly preferably 7 to 12 carbon atoms, and examples thereof include phenyloxycarbonylamino), an alkyl- or arylsulfonylamino group (preferably having 1 to 30 carbon atoms, more preferably 1 to 20 carbon atoms, and particularly preferably 1 to 12 carbon atoms, and examples thereof include methanesulfonylamino and benzenesulfonylamino), a sulfamoyl group (including a sulfamoyl group, and an alkyl- or arylsulfamoyl group; preferably a sulfamoyl group having 0 to 30 carbon atoms, more preferably 0 to 20 carbon atoms, and particularly preferably 0 to 12 carbon atoms, and examples thereof include sulfamoyl, methylsulfamoyl, dimethylsulfamoyl, and phenylsulfamoyl), a carbamoyl group (including a carbamoyl group and an alkyl- or arylcarbamoyl group; preferably a carbamoyl group having 1 to 30 carbon atoms, more preferably 1 to 20 carbon atoms, and particularly preferably 1 to 12 carbon atoms, and examples thereof include carbamoyl, methylcarbamoyl, diethylcarbamoyl, and phenylcarbamoyl), an alkylthio group (preferably an alkylthio group having 1 to 30 carbon atoms, more preferably 1 to 20 carbon atoms, and particularly preferably 1 to 12 carbon atoms, and examples thereof include methylthio and ethylthio), an arylthio group (preferably an arylthio group having 6 to 30 carbon atoms, more preferably 6 to 20 carbon atoms, and particularly preferably 6 to 12 carbon atoms, and examples thereof include phenylthio), a heterocyclic thio group (preferably a heterocyclic thio group having 2 to 30 carbon atoms, more preferably 2 to 20 carbon atoms, and particularly preferably 2 to 12 carbon atoms, and examples thereof include pyridylthio, 2-benzimizolylthio, 2-benzoxazolylthio, and 2-benzothiazolylthio), an alkyl- or arylsulfonyl group (preferably an alkyl- or arylsulfonyl group having 1 to 30 carbon atoms, more preferably 1 to 20 carbon atoms, and particularly preferably 1 to 12 carbon atoms, and examples thereof include mesyl and tosyl), an alkyl- or arylsulfinyl group (preferably an alkyl- or arylsulfinyl group having 1 to 30 carbon atoms, more preferably 1 to 20 carbon atoms, and particularly preferably 1 to 12 carbon atoms, and examples thereof include methanesulfinyl and benzenesulfinyl), a ureido group (preferably a ureido group having 1 to 30 carbon atoms, more preferably 1 to 20 carbon atoms, and particularly preferably 1 to 12 carbon atoms, and examples thereof include ureido, methylureido, and phenylureido), a phosphoric acid amide group (preferably a phosphoric acid amide group having 1 to 30 carbon atoms, more preferably 1 to 20 carbon atoms, and particularly preferably 1 to 12 carbon atoms, and examples thereof include diethylphosphoric acid amide and phenylphosphoric acid amide), a hydroxy group, a mercapto group, a halogen atom (examples thereof include a fluorine atom, a chlorine atom, a bromine atom, and an iodine atom, and more preferred is a fluorine atom), a cyano group, a sulfo group, a carboxyl group, an oxo group, a nitro group, a hydroxamic acid group, a sulfino group, a hydrazino group, an imino group, a heterocyclic group (preferably a heterocyclic group having 1 to 30 carbon atoms, and more preferably 1 to 12 carbon atoms; preferred examples of the ring-constituting heteroatom include a nitrogen atom, an oxygen atom, and a sulfur atom, and specific examples thereof include imidazolyl, pyridyl, quinolyl, furyl, thienyl, piperidyl, morpholino, benzoxazolyl, benzimidazolyl, benzothiazolyl, a carbazolyl group, and an azepinyl group), a silyl group (preferably a silyl group having 3 to 40 carbon atoms, more preferably 3 to 30 carbon atoms, and particularly preferably 3 to 24 carbon atoms, and examples thereof include trimethylsilyl and triphenylsilyl), and a silyloxy group (preferably a silyloxy group having 3 to 40 carbon atoms, more preferably 3 to 30 carbon atoms, and particularly preferably 3 to 24 carbon atoms, and examples thereof include trimethylsilyloxy and triphenylsilyloxy).

These substituents may be further substituted with any one or more substituents selected from the Substituent Group α described above.

Meanwhile, according to the invention, when there are plural substituents at one structural site, those substituents may be linked to each other and form a ring, or those substituents may be condensed with a portion or the entirety of the structural site and form an aromatic ring or an unsaturated heterocyclic ring.

<<Component of Functional Polymer Membrane>>

The functional polymer membrane of the invention has at least a structure represented by Formula (1) and a structure represented by Formula (2). In the invention, the functional polymer membrane is formed by conducting polymerization-curing reaction of composition containing (hereinafter, referred to as "composition for forming functional polymer membrane") preferably containing a (A) styrene-based monomer represented by the following Formula (HSM), a (B) crosslinking agent represented by the following Formula (CL), and a (C) chain transfer agent for forming the structure represented by Formula (1), as an essential component, and, as necessary, a (D) polymerization initiator represented by Formula (PI-1) or (PI-2), a (E) polymerization initiator represented by Formula (AI), and a (F) a solvent.

Hereinafter, the components constituting the functional polymer membrane of the invention will be described in detail.

<(A) Styrene-Based Monomer>

The above described component (A) used in the composition for forming the functional polymer membrane in the invention is a styrene-based monomer represented by the following Formula (HSM).

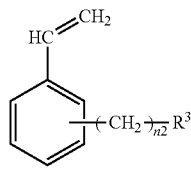

Formula (HSM)

In Formula (HSM), $R^3$ represents a halogen atom or $-N^+(R^4)(R^5)(R^6)(X_3^-)$, n2 represents an integer of 1 to 10, where $R^4$ to $R^6$ each independently represent a linear or branched alkyl group or aryl group, $R^4$ and $R^5$, or $R^4$, $R^5$, and $R^6$ may be bonded to one another to form an aliphatic hetero ring, and $X_3^-$ represents an organic or inorganic anion.

Here, $-(CH_2)_{n2}-R^3$ may be divided into a group represented by the following Formula (ALX) and a group represented by the following Formula (ALA).

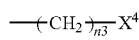

Formula (ALX)

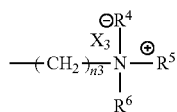

Formula (ALA)

In Formulae (ALX) and (ALA), $X^4$ represents a halogen atom, $R^4$ to $R^6$ and $X_3^-$ each have the same meaning as $R^4$ to $R^6$ and $X_3^-$ in Formula (HSM), and preferred ranges thereof are also the same. n3 has the same meaning as n2 in Formula (HSM), and preferred ranges thereof are also the same.

Examples of halogen atom of $R^3$ in Formula (HSM) and $X^4$ in Formula (ALX) include a fluorine atom, a chlorine atom, a bromine atom, and an iodine atom. A fluorine atom, a chlorine atom, and a bromine atom are preferred, a chlorine atom and a bromine atom are more preferred, and a chlorine atom is particularly preferred.

n2 in Formula (HSM) and n3 in both Formulae (ALX) and (ALA) are preferably 1 or 2, and is particularly preferably 1.

The alkyl group and the aryl group for $R^4$ to $R^6$ in Formulae (HSM) and (ALA) preferably has the same preferable range as the alkyl group and aryl group for Ra, Rb, Rc, and Rd in Formula (2).

The ring that is formed when $R^4$ and $R^5$ are bonded to each other is preferably a 5-membered or 6-membered ring, and examples thereof include a pyrrolidine ring, a piperidine ring, a morpholine ring, a thiomorpholine ring, and a piperazine ring.

Examples of the ring that is formed when $R^4$, $R^5$, and $R^6$ are bonded to one another include a quinuclidine ring and a triethylenediamine ring (1,4-diazabicyclo[2.2.2] octane ring).

$X_3^-$ in Formulae (HSM) and (ALA) has the same meaning as $X_1^-$ and $X_2^-$ in Formula (2), and preferred ranges thereof are also the same.

Among the groups represented by Formula (ALX) or (ALA), a group represented by Formula (ALA) is preferred.

Hereinafter, a styrene-based monomer in the case where $-(CH_2)_{n2}-R^3$ in Formula (HSM) is a group represented by the Formula (ALA) is sometimes referred to as a styrene-based monomer (SM). Here, specific examples of the styrene-based monomer (SM) are exemplified, but the invention is not limited thereto.

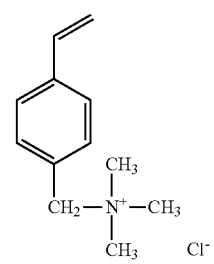

(SM-1)

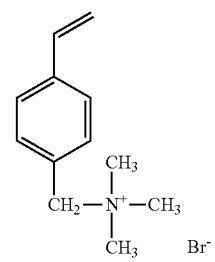

(SM-2)

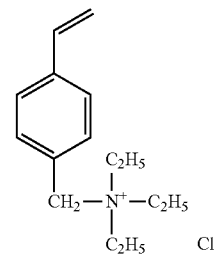

(SM-3)

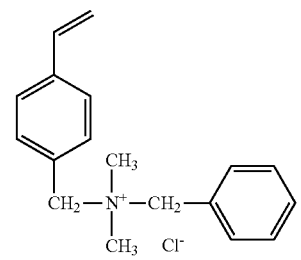

(SM-4)

-continued (SM-5)
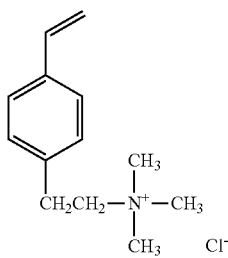

(SM-6)
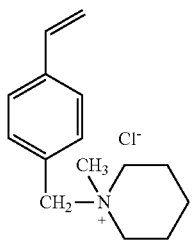

(SM-7)
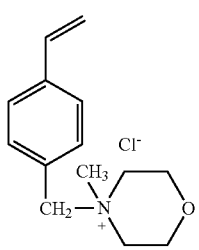

(SM-8)
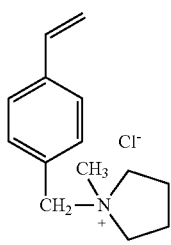

(SM-9)
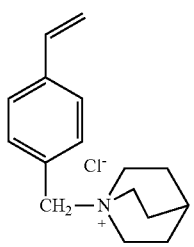

The compounds of the monofunctional styrene-based monomer (SM) can be synthesized by a method described in JP2000-229917A and JP JP2000-212306A or a method analogous thereto. Further, the compounds can also be obtained as commercially available product from Sigma-Aldrich Co. LLC.

In the functional polymer membrane of the invention, monofunctional styrene-based monomers (SM) may be used in combination of two or more thereof.

In the case where $-(CH_2)_{n2}-R^3$ in Formula (HSM) represents a group represented by Formula (ALX), the functional polymer membrane becomes preferably an anion-exchange membrane by reacting tertiary amine compounds which is a quaternary ammonium agent after polymerization-curing reaction.

In the present specification, hereinafter, a styrene-based monomer in the case where $-(CH_2)_{n2}-R^3$ in Formula (HSM) represents a group represented by the Formula (ALA) is referred to as a styrene-based monomer (SM). Here, specific examples of the styrene-based monomer (HSM) are shown, but the invention is not limited thereto.

HSM-1
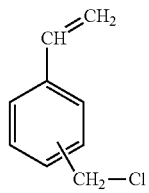

HSM-2
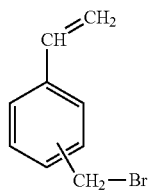

HSM-3
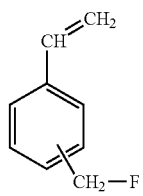

HSM-4
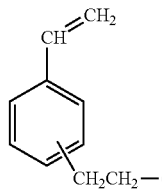

HSM-5
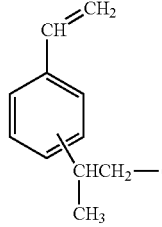

HSM-6
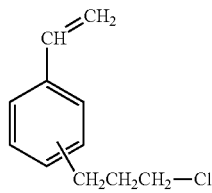

HSM-7
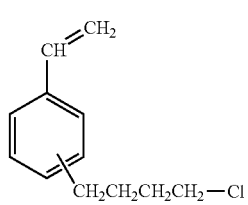

-continued

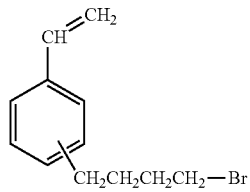
HSM-8

In the invention, the content of the styrene-based monomer represented by Formula (HSM) is preferably 1 part by mass to 85 parts by mass, more preferably 10 parts by mass to 60 parts by mass, and particularly preferably 20 parts by mass to 40 parts by mass with respect to 100 parts by mass of the total solid content of the composition for forming the functional polymer membrane.

The tertiary amine compound which is a quaternary ammonium agent is represented by the following Formula (AA).

Formula (AA)

$R^4$ to $R^6$ in Formula (AA) have the same meanings as $R^4$ to $R^6$ in Formula (ALA), and preferred ranges thereof are also the same.

Next, specific examples of the tertiary amine compound which is a quaternary ammonium agent are shown, and the invention is not limited thereto.

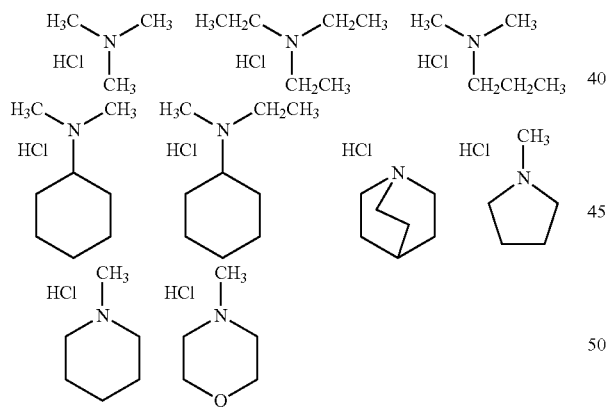

The reaction conditions at the time of reacting the tertiary amine compound which is a quaternary ammonium agent with the membrane after polymerization-curing are not particularly limited, but a reaction is generally carried out by immerging the polymerization-cured membrane in the tertiary amine compound solution. The concentration of the amine compound solution at this time is preferably 0.01 mol/L to 5.00 mol/L, more preferably 0.05 mol/L to 3.00 mol/L, and particularly preferably 0.10 mol/L to 1.00 mol/L.

The temperature at the time of immersing the polymerization-cured membrane in the tertiary amine compound solution is preferably 0° C. to 100° C., more preferably 10° C. to 80° C., and particularly preferably 20° C. to 60° C.

Time at the time of immersing the polymerization-cured membrane in the tertiary amine compound solution is preferably 0.5 hours to 24 hours, more preferably 1 hour to 18 hours, and particularly preferably 2 hours to 12 hours <(B) Crosslinking Agent Represented by Formula (CL)>

A (B) crosslinking agent represented by the following Formula (CL) is used to form the structure represented by Formula (2) in the functional polymer membrane of the invention.

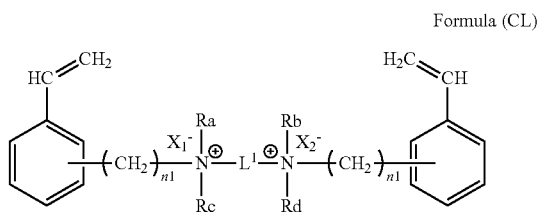
Formula (CL)

Each of $L^1$, Ra, Rb, Rc, Rd, n1, $X_1^-$, and $X_2^-$ in Formula (CL) has the same meaning as each of $L^1$, Ra, Rb, Rc, Rd, n1, $X_1^-$, and $X_2^-$ in Formula (2), and preferred ranges thereof are also the same.

Hereinafter, specific examples of the crosslinking agent represented by Formula (CL) are shown, but the invention is not limited thereto.

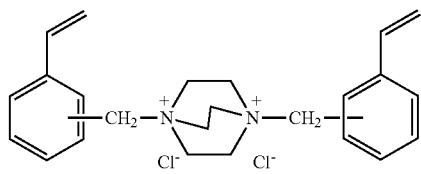
(CL-1)

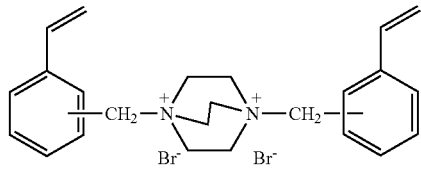
(CL-2)

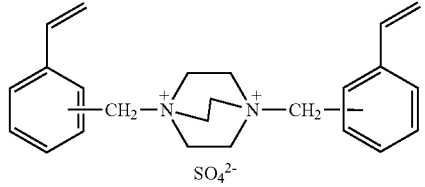
(CL-3)

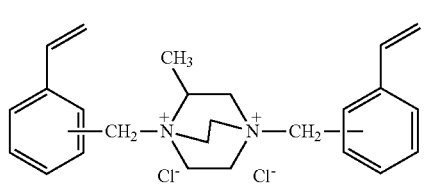
(CL-4)

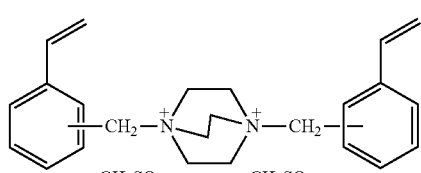
(CL-5)

-continued

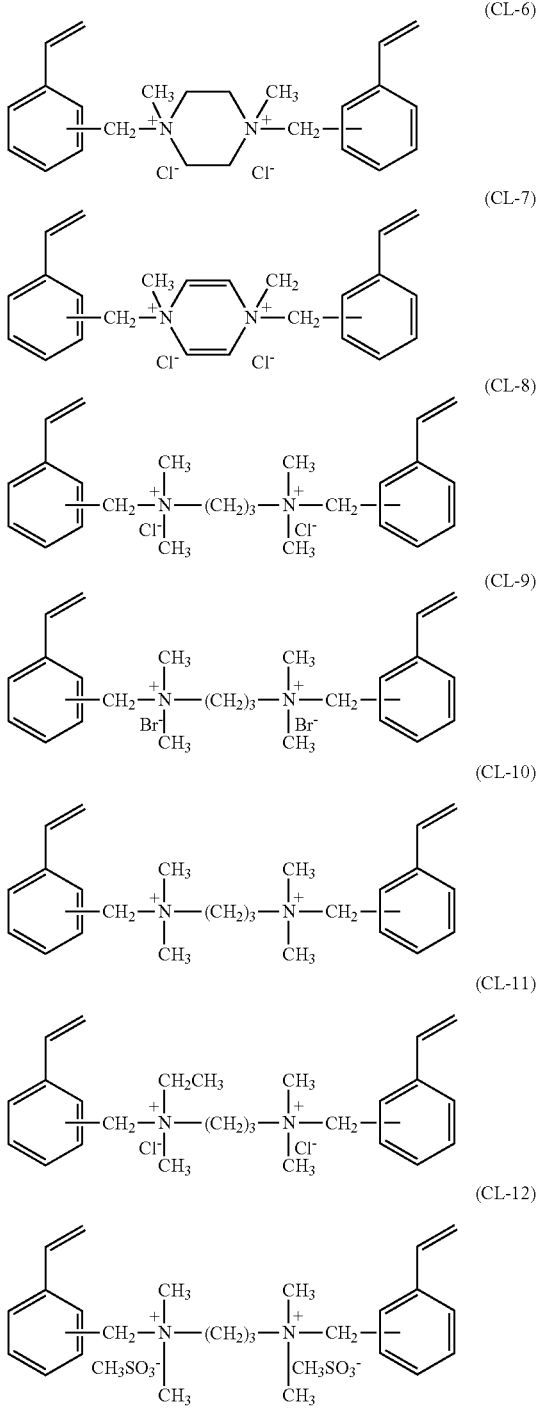

The crosslinking agent represented by Formula (CL) can be synthesized by a method described in JP2000-229917A or a method analogous thereto.

The functional polymer membrane of the invention may be used in combination of two or more (B) crosslinking agents represented by Formula (CL).

In the invention, the content of the (B) crosslinking agent represented by Formula (CL) is preferably 10 parts by mass to 100 parts by mass, more preferably 15 parts by mass to 90 parts by mass, and particularly preferably 20 parts by mass to 80 parts by mass with respect to 100 parts by mass of the total solid content of the composition for forming the functional polymer membrane.

In the composition for forming the functional polymer membrane of the invention, molar ratio ((A)/(B)) of a (A) styrene-based monomer represented by Formula (HSM) to a (B) crosslinking agent represented by Formula (CL) is preferably 1/0.1 to 1/55, more preferably 1/0.14 to 1/55, and particularly preferably 1/0.3 to 1/55.

In the invention, the crosslinking density of the polymer formed by reacting a (A) styrene-based monomer represented by Formula (HSM) and a (B) crosslinking agent represented by Formula (CL) is preferably 0.4 mmol/g to 2 mmol/g, more preferably 0.5 mmol/g to 2 mmol/g, and particularly preferably 1.0 mmol/g to 2 mmol/g.

If the crosslinking density is within the above range, it is preferable in that the membrane moisture content is reduced, the coefficient of water permeability is lowered, and the membrane resistance is also small.

<(C) Chain Transfer Agent>

A (C) chain transfer agent used in the composition for forming the functional polymer membrane of the invention is not particularly limited, but a chain transfer agent represented by the following Formula (3) is preferred.

   Formula (3)

In Formula (3), $LL^a$ represent a single bond or an alkylene group which may have a substituent, —O—, —S—, —$NR^{Za}$—, or a linking group obtained by combining these, $LL^1$ and $LL^2$ each independently represent —$(CR^1R^2)_l$— or —$(CR^1R^2)_l$—C(=O)O— (in which the atom bonded to $LL^a$ is an oxygen atom), $R^1$ and $R^2$ each independently represent a hydrogen atom or an alkyl group, l represents 1 or 2, $R^{Za}$ represents a hydrogen atom or a substituent, however, in a case where terminal atoms of a substituent in $LL^a$ and a substituent of $R^{Za}$ are a sulfur atom, $LL^a$ is SH.

$LL^1$ and $LL^2$ in Formula (3) have the same meaning as $LL^1$ and $LL^2$ in Formula (1), and preferred ranges thereof are also the same.

$LL^a$ has the same meaning as LL in Formula (1) except that $LL^a$ is SH in the case where terminal atoms of the substituent in $LL^a$ and the substituent of $R^{Za}$ are sulfur atom, and preferred range thereof is also the same.

Accordingly, the chain transfer agent represented by Formula (3) is preferably the chain transfer agent represented by the following Formula (3A).

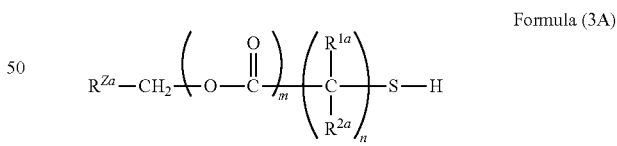   Formula (3A)

In Formula (3A), $R^{Za}$ represents —SH or -*$CR^{3b}R^{4b}R^{5b}$. * represents a carbon atom bonded to the carbon atom of methylene, $R^{3b}$, $R^{4b}$, and $R^{5b}$ each independently represent a non-substituted alkyl group, —$CH_2OH$, -$CH_2(OC=O)_m(CR^{1a}R^{2a})_nSH$, or -$CH_2OCH_2C[CH_2(OC=O)_m(CR^{1a}R^{2a})_nSH]_3$. ** represents a carbon atom bonded to the *C. However, when $R^Z$ is not —SH, not all of $R^{3b}$ to $R^{5b}$ is a non-substituted alkyl group or —$CH_2OH$. $R^{1a}$ and $R^{2a}$ each independently represent a hydrogen atom, an alkyl group, or a hydroxy group. However, in the case where n is 2 or more, $R^{1a}$ and $R^{2a}$ on the carbon atom bonded to the sulfur atom is a hydrogen atom or an alkyl group. m represents 0 or 1, and n represents an integer of 1 to 12.

Each of $R^{1a}$, $R^{2a}$, m, and n has the same meaning as each of $R^{1a}$, $R^{2a}$, m, and n in Formula (1A), and preferred ranges thereof are also the same.

Each of $R^{Za}$, $R^{3b}$, $R^{4b}$ and $R^{5b}$ has the same meaning as each of $R^Z$, $R^{3a}$, $R^{4a}$, and $R^{5a}$ in Formula (1A) except that $R^Z$, $R^{3a}$, $R^{4a}$, and $R^{5a}$ is SH in the case where terminal atoms of $R^Z$, $R^{3a}$, $R^{4a}$, and $R^{5a}$ in Formula (1A) are sulfur atom, and preferred ranges thereof are also the same.

Hereinafter, specific examples of the chain transfer agent represented by Formula (3) are shown, but the invention is not limited thereto.

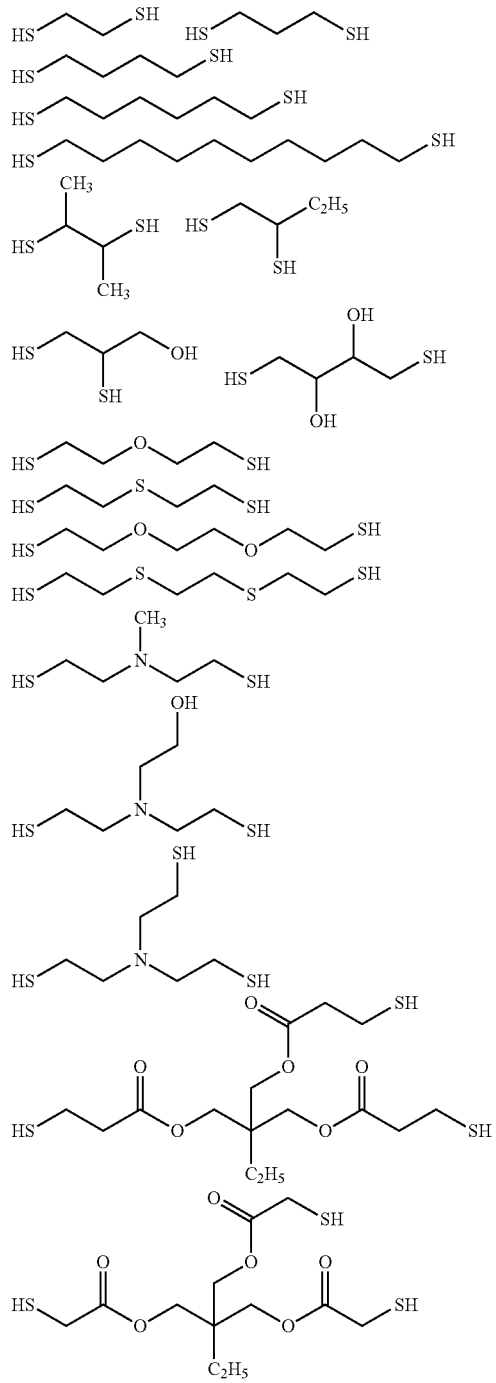

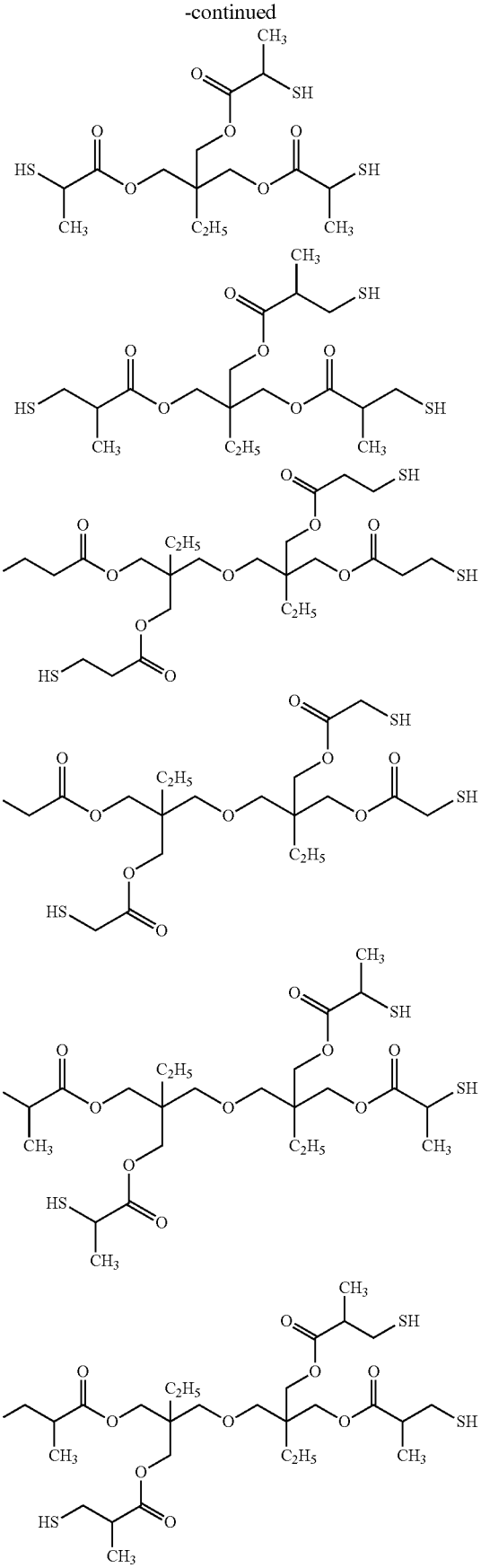

23
-continued
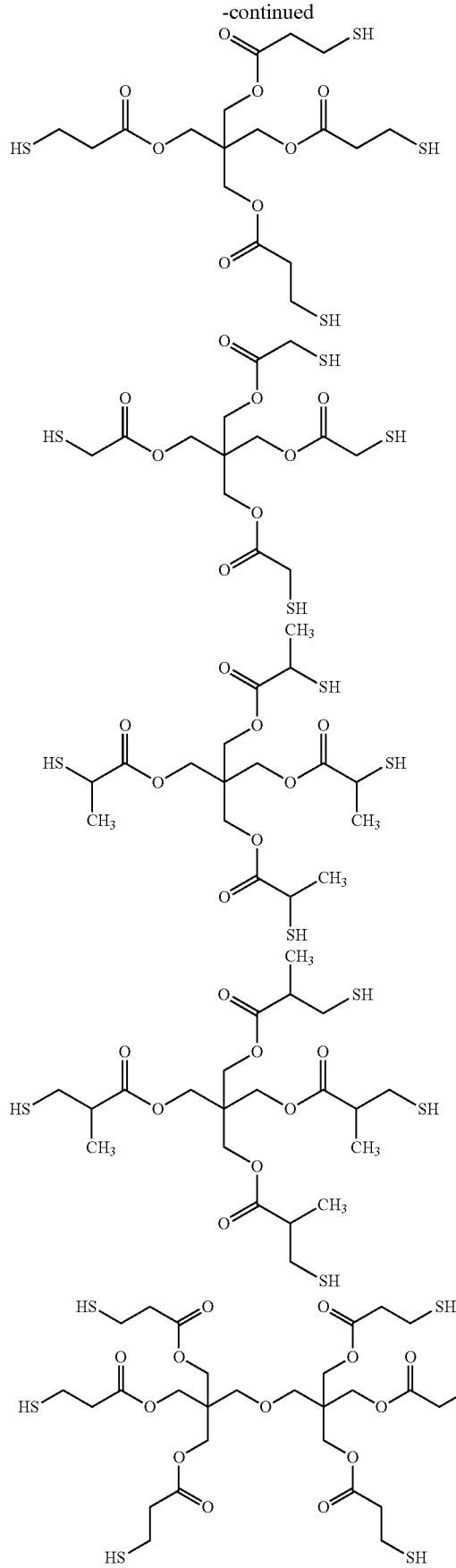
24
-continued
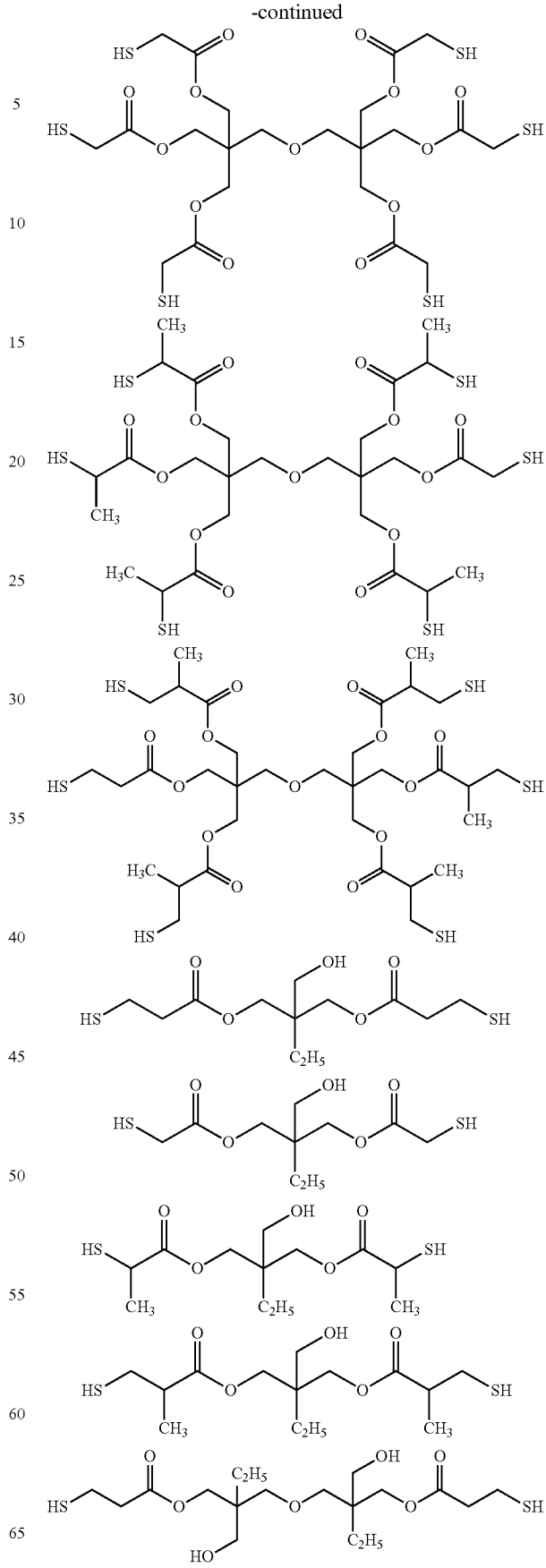

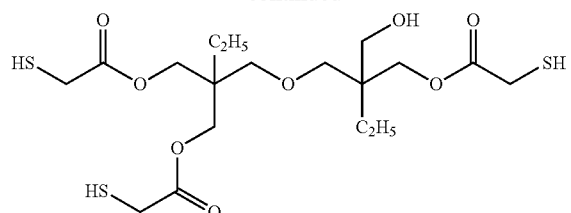
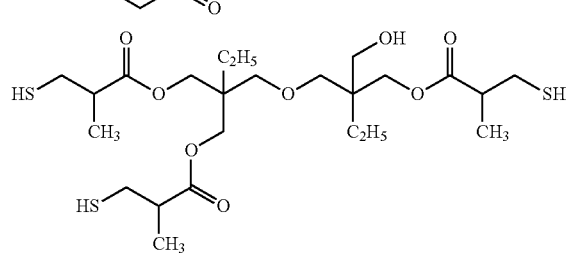
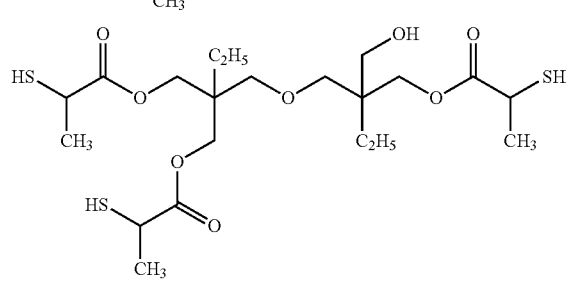
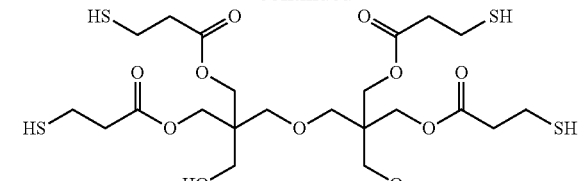
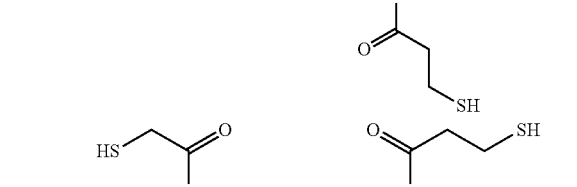
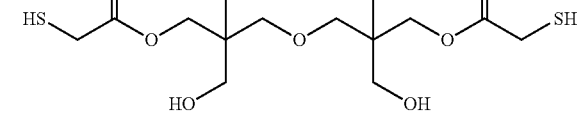
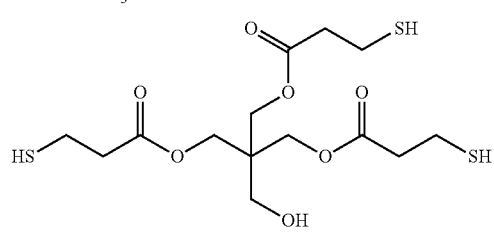
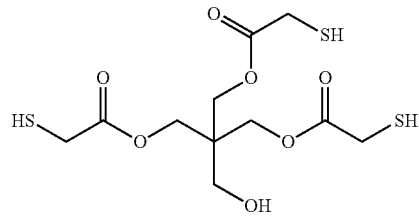
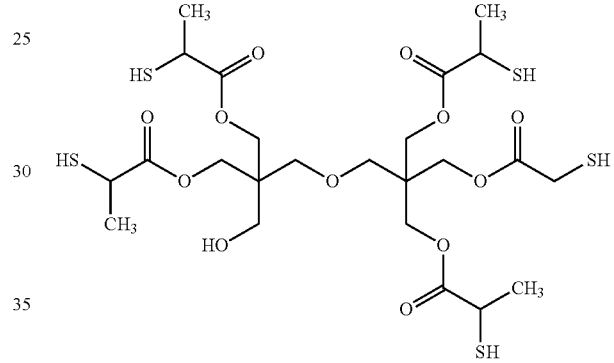
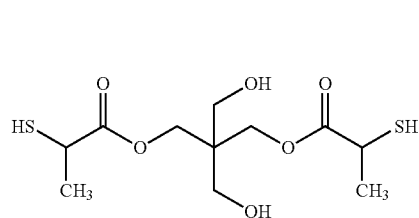
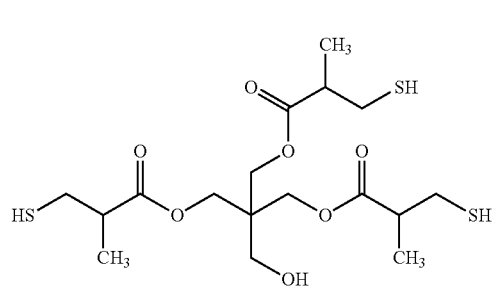
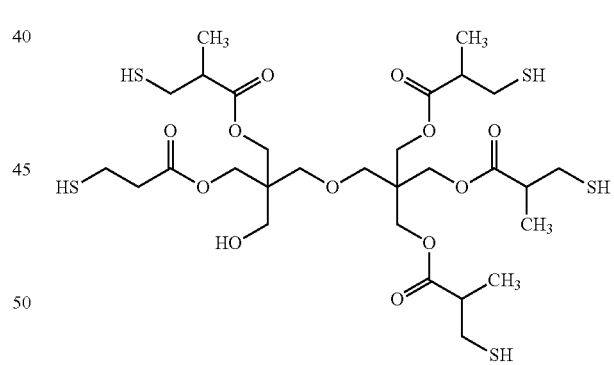

In the invention, the content of the (C) chain transfer agent represented by Formula (3) is preferably 0.01 parts by mass to 10 parts by mass, more preferably 0.05 parts by mass to 10 parts by mass, even more preferably 0.05 parts by mass to 5 parts by mass, and particularly preferably 0.2 parts by mass to 3 parts by mass with respect to 100 parts by mass of the total solid content of the composition for forming the functional polymer membrane.

<(D) Polymerization Initiator>

The composition for forming the functional polymer membrane of the invention preferably includes a (D) polymerization initiator represented by Formula (PI-1) or (PI-2).

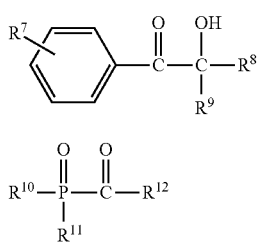

Formula (PI-1)

Formula (PI-2)

In Formula (PI-1), $R^7$ represents a hydrogen atom, an alkyl group, an alkenyl group, an alkoxy group, or an aryloxy group, $R^8$ and $R^9$ each independently represent a hydrogen atom, an alkyl group, an alkenyl group, an alkoxy group, or an aryloxy group, and $R^8$ and $R^9$ may be bonded to each other to form a ring.

In Formula (PI-2), $R^{10}$ represents an alkyl group, an aryl group, an alkylthio group, or an arylthio group, $R^{11}$ represents an alkyl group, an aryl group, an alkylthio group, an arylthio group, or an acyl group, and $R^{12}$ represents an alkyl group or an aryl group.

$R^7$ preferably represents a hydrogen atom, an alkyl group having 1 to 18 carbon atoms, an alkenyl group having 2 to 10 carbon atoms, an alkoxy group having 1 to 10 carbon atoms, and an aryloxy group having 6 to 12 carbon atoms. An alkyl group, an alkenyl group, an alkoxy group, and an aryloxy group may have a substituent, and the substituent may be any substituents selected from the Substituent Group α.

The aryl in an aryloxy group is preferably phenyl.

$R^7$ is particularly preferably a hydrogen atom, an alkyl group having 1 to 4 carbon atoms, and an alkoxy group having 1 to 4 carbon atoms, in the case of an alkoxy group, a methoxy and 2-hydroxyethoxy are preferred, in the case of an alkyl group, a methyl group substituted with a phenyl group is preferred, and the phenyl group which is substituted with —C(=O)—C($R^8$)($R^9$)(OH) to form a methylene bis- group as a whole molecule may be preferred.

$R^8$ and $R^9$ are preferably an alkyl group, an alkenyl group, an alkoxy group, or an aryloxy group, more preferably an alkyl group having 1 to 8 carbon atoms, an alkenyl group having 2 to 8 carbon atoms, an alkoxy group having 1 to 8 carbon atoms, an aryloxy group having 6 to 10 carbon atoms, even more preferably an alkyl group, and particularly preferably methyl. An alkyl group, an alkenyl group, alkoxy group, and an aryloxy group may have a substituent, and the substituent may be any of substituents selected from the Substituent Group α.

The ring that is formed when $R^8$ and $R^9$ are bonded to each other is preferably a 5-membered or 6-membered ring, and a cyclopentane ring and a cyclohexane ring are particularly preferred.

The alkyl group for $R^{10}$ to $R^{12}$ is preferably an alkyl group having 1 to 8 carbon atoms, the aryl group for $R^7$ to $R^9$ is preferably an aryl group having 6 to 16 carbon atoms, and the aryl group may have a substituent. The substituent may be any of substituents selected from the Substituent Group α, and an alkyl group and an alkoxy group are preferred.

The alkylthio group or an arylthio group for $R^{10}$ and $R^{11}$ is preferably an alkylthio group having 1 to 12 carbon atoms or an arylthio group having 6 to 12 carbon atoms.

The acyl group for $R^{11}$ is preferably an alkylcarbonyl group or an arylcarbonyl group, and more preferably an alkylcarbonyl group having 2 to 12 carbon atoms and an arylcarbonyl group having 7 to 17 carbon atoms. Among them, $R^{11}$ is preferably arylcarbonyl groups and particularly preferably a phenylcarbonyl group which may have a substituent. The acyl group may have a substituent, and the substituent may be any of substituents selected from the Substituent Group α.

The polymerization initiator represented by Formula (PI-1) is more preferred than the polymerization initiator represented by Formula (PI-2).

Hereinafter, specific examples of the polymerization initiator represented by Formula (PI-1) or (PI-2) are shown, and the invention is not limited thereto.

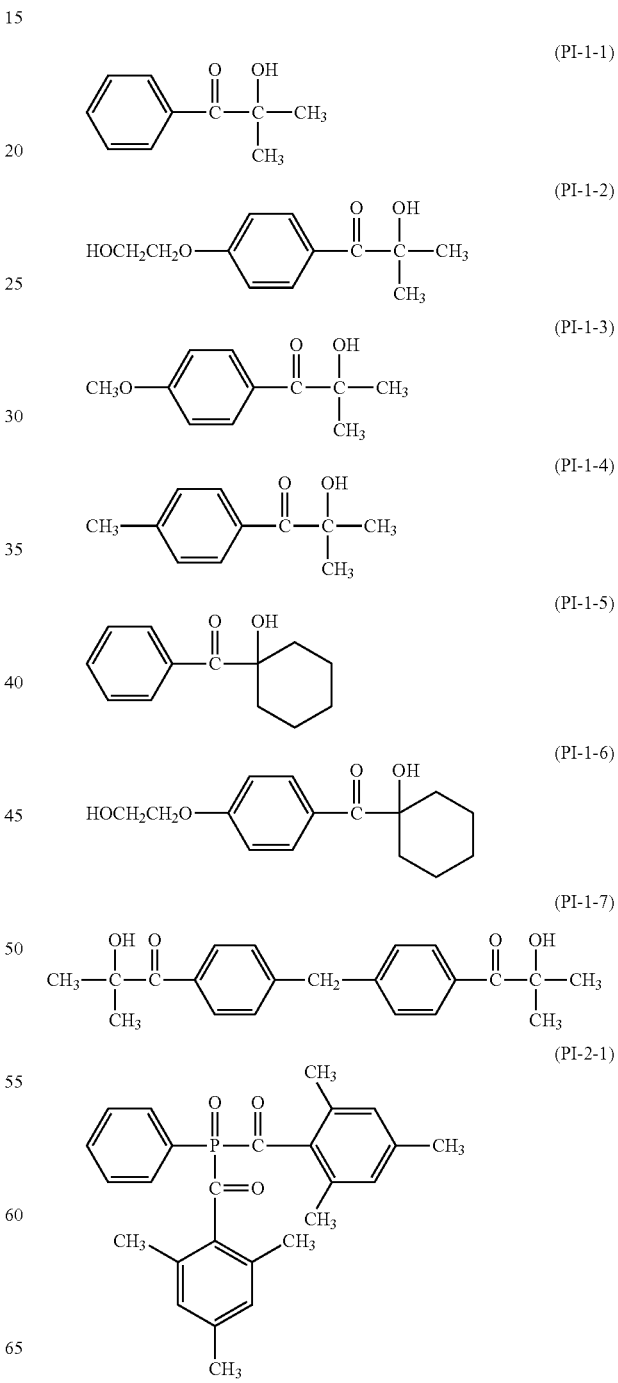

(PI-2-2)
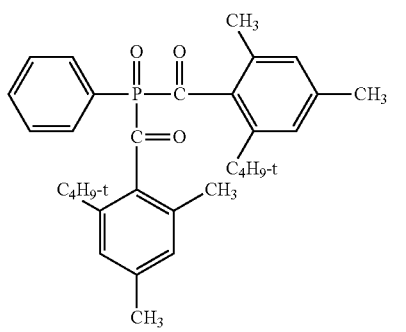

(PI-2-3)
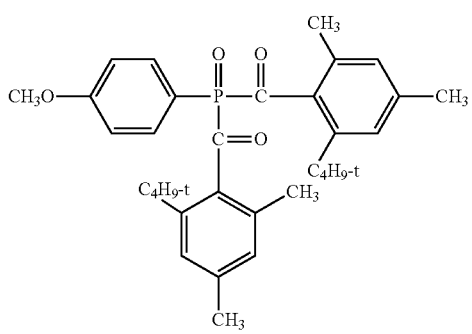

(PI-2-4)
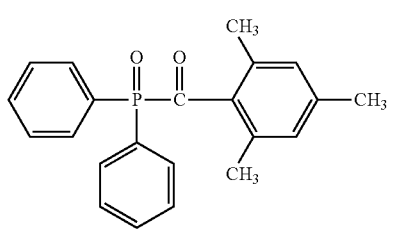

(PI-2-5)
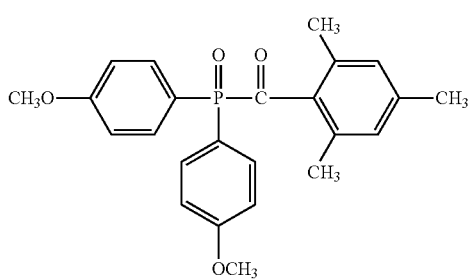

(PI-2-6)
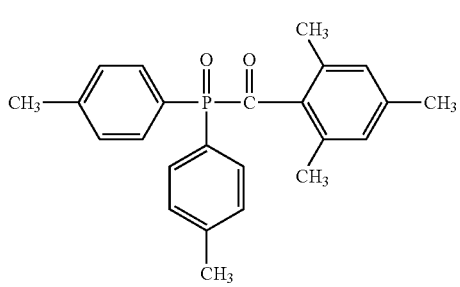

(PI-2-7)
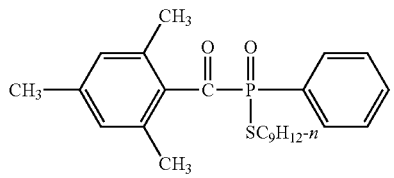

(PI-2-8)
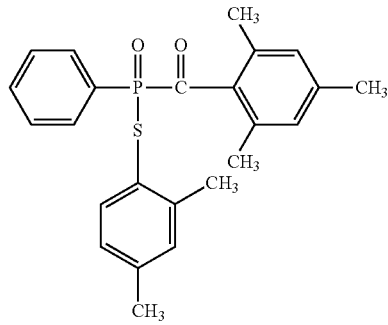

A polymerization initiator represented by Formula (PI-1) or (PI-2) may be obtained from BASF Japan Ltd., and the like.

In the invention, the content of the (D) polymerization initiator represented by Formula (PI-1) or (PI-2) is preferably 0.1 parts by mass to 20 parts by mass, more preferably 0.1 parts by mass to 10 parts by mass, and particularly preferably 0.5 parts by mass to 5 parts by mass with respect to 100 parts by mass of the total solid content of the composition for forming the functional polymer membrane.

The composition for forming the functional polymer membrane of the invention preferably further contains a (E) polymerization initiator represented by the following Formula (AI).

Formula (AI)

$$\text{Re}-\text{N}\overset{Y}{\underset{Rf}{\parallel}}\overset{R^{13}}{\underset{R^{14}}{\text{C}-\text{C}}}-\text{N}=\text{N}-\overset{R^{15}}{\underset{R^{16}}{\text{C}-\text{C}}}\overset{Y}{\underset{Rg}{\parallel}}\text{N}-\text{Rh}$$

In Formula (AI), $R^{13}$ to $R^{16}$ each independently represent an alkyl group, Y represents $=$O or $=$N-Ri. Re to Ri each independently represent a hydrogen atom or an alkyl group. Re and Rf, Rg and Rh, Re and Ri, and Rh and Ri may be bonded to each other to form a ring, respectively.

The alkyl group for $R^{13}$ to $R^{16}$ preferably has 1 to 8 carbon atoms, and more preferably 1 to 4 carbon atoms, and methyl is particularly preferred.

Re to Ri is preferably a hydrogen atom or an alkyl group having 1 to 8 carbon atoms.

The ring formed when Re and Rf, Rg and Rh, Re and Ri, and Rh and Ri may be bonded to each other is preferably a 5 or 6-membered ring.

The ring formed when Re and Ri, and Rh and Ri are bonded to each other is particularly preferably an imidazoline ring, and the ring formed when Re and Rf, and Rg and Rh are bonded to each other is particularly preferably a pyrrolidine ring, a piperidine ring, a piperazine ring, a morpholine ring, and a thiomorpholine ring.

Y is preferably $=$N-Ri.

Hereinafter, specific examples of the polymerization initiator represented by Formula (AI) are shown, and the invention is not limited thereto.

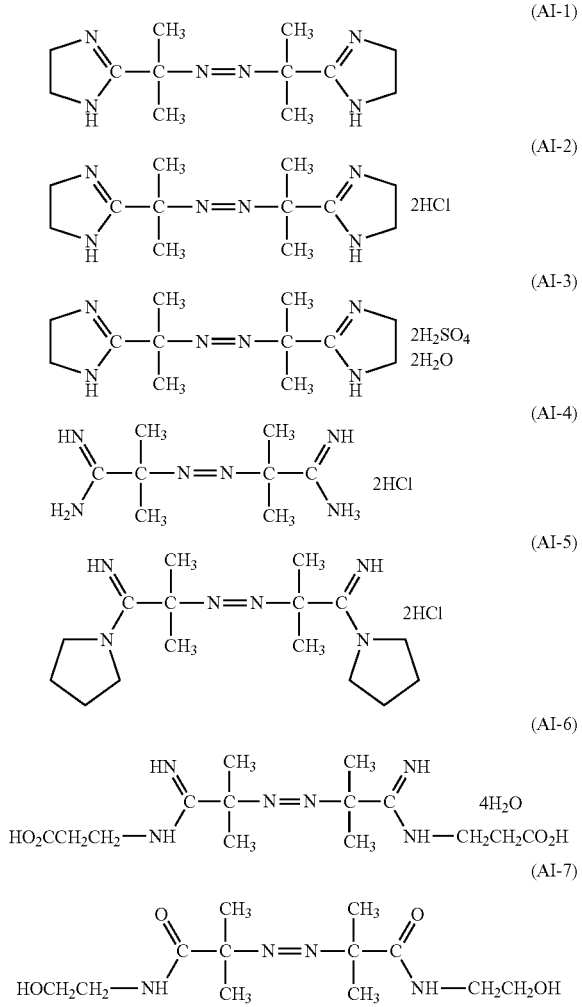

The polymerization initiator represented by Formula (AI) can be obtained from Wako Pure Chemical Industries, Ltd., an exemplary compound (AI-1) is VA-061, an exemplary compound (AI-2) is VA-044, an exemplary compound (AI-3) is VA-046B, an exemplary compound (AI-4) is V-50, an exemplary compound (AI-5) is VA-067, an exemplary compound (AI-6) is VA-057, and an exemplary compound (AI-7) is VA086 (all trade names) and they are all commercially available.

In the invention, the content of (E) polymerization initiator represented by Formula (AI) is preferably 0.1 parts by mass to 20 parts by mass, more preferably 0.1 parts by mass to 10 parts by mass, and particularly preferably 0.5 parts by mass to 5 parts by mass with respect to 100 parts by mass of the total solid content of the composition for forming the functional polymer membrane.

(F) Solvent

The composition for forming the functional polymer membrane of the invention may contain a (F) solvent.

In the invention, the content of the (F) solvent in the composition for forming the functional polymer membrane is preferably 5 parts by mass to 60 parts by mass, and more preferably 10 parts by mass to 40 parts by mass with respect to 100 parts by mass of the total composition.

If the content of the solvent is within this range, the viscosity of the composition for forming the functional polymer membrane is not increased, and a homogeneous membrane can be produced. Further, generation of pinholes (micro defect holes) is suppressed For the (F) solvent, a solvent having a solubility in water of 5% by mass or more is preferably used, and a solvent being freely miscible with water is preferred. For this reason, a solvent selected from water and a water-soluble solvent is preferred. Particularly preferred examples of the water-soluble solvent include an alcohol-based solvent, an ether-based solvent which is an aprotic polar solvent, an amide-based solvent, a ketone-based solvent, a sulfoxide-based solvent, a sulfone-based solvent, a nitrile-based solvent, and an organic phosphorus-based solvent. Water and alcohol-based solvents are preferred, and examples of the alcohol-based solvent include methanol, ethanol, isopropanol, n-butanol, ethylene glycol, propylene glycol, diethylene glycol, and dipropylene glycol. In the alcohol-based solvent, ethanol, isopropanol, n-butanol, and ethylene glycol are more preferred, and isopropanol is particularly preferred. These may be used alone or in combination of two or more kinds. Water alone or a combination of water and a water-soluble solvent is preferred, and water alone or a combination of water and at least one alcohol-based solvent is more preferred. In the combination of water and a water-soluble solvent, isopropanol is preferably 0.1% to 10%, more preferably 0.5% to 5%, and even more preferably 1.0% to 2.0% with respect to 100% by mass of water.

Furthermore, preferred examples of the aprotic polar solvent include dimethyl sulfoxide, dimethylimidazolidinone, sulfolane, N-methylpyrrolidone, dimethylformamide, acetonitrile, acetone, dioxane, tetramethylurea, hexamethylphosphorotriamide, pyridine, propionitrile, butanone, cyclohexanone, tetrahydrofuran, tetrahydropyran, ethylene glycol diacetate, γ-butyrolactone, and the like. Among them, dimethyl sulfoxide, N-methylpyrrolidone, dimethylformamide, dimethylimidazolidinone, sulfolane, acetone or acetonitrile, and tetrahydrofuran are preferred. These may be used alone, or in combination of two or more kinds thereof.

(G) Polymerization Inhibitor

The composition for forming the functional polymer membrane of the invention preferably contains a polymerization inhibitor in order to provide stability to the coating solution for forming the membrane.

As the polymerization inhibitor, known polymerization inhibitors can be used, and examples thereof include phenolic compounds, hydroquinone compounds, amine compounds, mercapto compounds, and the like.

As the phenolic compound, specific examples of the phenolic compound include a hindered phenol (a phenol having a t-butyl group at the ortho-position, and a representative example is 2,6-di-t-butyl-4-methylphenol), and a bisphenol. Specific examples of the hydroquinone compound include monomethyl ether hydroquinone. Specific examples of the amine compound include N-nitroso-N-phenylhydroxylamine and N,N-diethylhydroxylamine. Specific examples of the aliphatic heterocyclic compound include 4-hydroxy-2,2,6,6-tetramethylpiperidine 1-oxyl.

Meanwhile, these polymerization inhibitors may be used alone or in combination of two or more kinds thereof.

The content of the polymerization inhibitor is preferably 0.01 parts by mass to 5 parts by mass, more preferably 0.01 parts by mass to 1 part by mass, and even more preferably 0.01 parts by mass to 0.5 parts by mass with respect to 100 parts by mass of the total solid content in the composition for forming the functional polymer membrane.

[Other Components]

The composition for forming the functional polymer membrane of the invention may include a surfactant, a polymer dispersant and an anti-cratering agent, and the like, in addition to the above components (A) to (G).

[Surfactant]

Various polymer compounds may be added to the composition for forming the functional polymer membrane of the invention in order to adjust membrane physical properties. As the polymer compound, acrylic polymer, polyurethane resins, polyamide resins, polyester resins, epoxy resins, phenolic resins, polycarbonate resins, polyvinyl butyral resins, polyvinyl formal resins, shellac, vinyl resins, acrylic resins, rubber-based resins, waxes, and other natural resins may be used. Also, they may be used in combination of two or more.

Further, a nonionic surfactant, a cationic surfactant, and an organic fluorocompound can also be added to adjust the liquid physical properties.

Specific examples of the surfactant include anionic surfactants such as alkyl benzene sulfonates, alkyl naphthalene sulfonates, higher fatty acid salts, sulfonates of higher fatty acid ester, sulfuric ester salts of higher alcohol ether, sulfonates of higher alcohol ether, alkyl carboxylates of higher alkylsulfonamide, and alkyl phosphates; nonionic surfactants such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerin, and polyoxyethylene sorbitan fatty acid esters; and amphoteric surfactants such as alkyl betaines and amido betaines in addition to these, a silicon-based surfactant, a fluorine-based surfactant, and the like. The surfactant can be appropriately selected from conventional known surfactants and derivatives thereof.

[Polymer Dispersant]

The composition for forming the functional polymer membrane of the invention may include a polymer dispersant.

Specific examples of the polymer dispersant include polyvinyl pyrrolidone, polyvinyl alcohol, polyvinyl methyl ether, polyethylene oxide, polyethylene glycol, polypropylene glycol, polyacrylamide, and the like, and among them, it is also preferable to use polyvinyl pyrrolidone.

[Anti-Cratering Agent]

An anti-cratering agent is also referred to as a surface control agent, a leveling agent, or a slip agent, and is intended to prevent unevenness of the membrane surface. Examples thereof include compounds of the structure of an organic modified polysiloxane (a mixture of polyether siloxane and polyether), a polyether modified polysiloxane copolymer, and a silicon modified copolymer.

Examples of commercially available products include Tego Glide 432, Tego Glide 110, Tego Glide 130, Tego Glide 406, Tego Glide 410, Tego Glide 411, Tego Glide 415, Tego Glide 420, Tego Glide 435, Tego Glide 440, Tego Glide 450, Tego Glide 482, Tego Glide A115, Tego Glide B1484, and Tego Glide ZG400 (all trade names), manufactured by Evonik industries.

The content of the anti-cratering agent is preferably 0 parts by mass to 10 parts by mass, more preferably 0 parts by mass to 5 parts by mass, and even more preferably 1 part by mass to 2 parts by mass with respect to 100 parts by mass of the total solid content in the composition for forming the functional polymer membrane.

The composition for forming the functional polymer membrane of the invention may also contain, as necessary, for example, a viscosity improving agent and a preservative, in addition to the above.

<Support>

A number of techniques may be used in order to provide a membrane of the invention having especially good mechanical intensity. For example, a support may be used as a reinforcing material for the membrane, and a porous support may be preferably used. The porous support can constitute a part of the membrane by polymerization-curing reaction after the composition for forming the functional polymer membrane is applied and/or impregnated.

Examples of the porous support as a reinforcing material include synthetic woven fabric, synthetic nonwoven fabric, a sponge-like membrane, a film having fine through-holes, or the like. Examples of materials for forming the porous support of the invention include for example, polyolefin (polyethylene, polypropylene, and the like), polyacrylonitrile, polyvinyl chloride, polyester, or a polyamide, and copolymers thereof, or be a porous membrane based on, for example polysulfone, polyether sulfone, polyphenylene sulfone, polyphenylene sulfide, polyimide, polyethermide, polyamide, polyamideimide, polyacrylonitrile, polycarbonate, polyacrylate, cellulose acetate, polypropylene, poly(4-methyl-1-pentene), polyvinylidene fluoride, polytetrafluoroethylene, polyhexafluoropropylene, or polychlorotrifluoroethylene, and copolymers thereof. Among them, the invention is preferably polyolefin.

Commercially available porous support and reinforcing material are, for example, commercially available from Japan Vilene Company, Ltd. and Freudenberg Filtration Technologies (Novatexx material) and Sefar AG.

In addition, in the case where the polymerization-curing reaction may be carried out by irradiating the porous support and reinforcing material with energy ray, the wavelength region of the energy ray is not blocked. That is, it is required to pass the irradiation of wavelength used for the polymerization-curing, but in the case of thermal polymerization-curing, there is no need to consider this point. Further, the porous reinforcing material is preferably a material into which the composition for forming the functional polymer membrane can be permeated.

The porous support preferably has hydrophilicity. It is possible to use a general method, such as corona treatment, ozone treatment, sulfuric acid treatment, silane coupling agent treatment in order to provide hydrophilicity to the support.

[Method for Producing Functional Polymer Membrane]

Next, a method for producing the functional polymer membrane of the invention will be described.

The method for producing the functional polymer membrane of the invention forms a membrane by performing polymerization-curing reaction of the composition for forming the functional polymer membrane containing a (A) styrene-based monomer represented by Formula (HSM), a (B) crosslinking agent represented by Formula (CL), and a (C) chain transfer agent represented by Formula (3).

The composition for forming the functional polymer membrane more preferably contains a (D) polymerization initiator represented by Formula (PI-1) or (PI-2), and a (E) polymerization initiator represented by Formula (AI).

The composition for forming the functional polymer membrane further contains a (F) solvent, the content of the solvent preferably 5 parts by mass to 60 parts by mass with respect to 100 parts by mass of the total composition for forming the functional polymer membrane.

Further, the (F) solvent is preferably water or a water-soluble solvent, and is preferably subjected to polymerization-curing reaction after the composition for forming the functional polymer membrane is applied and/or impregnated onto the support. In addition, the polymerization-curing reaction is preferably a polymerization-curing reaction conducting polymerization by energy ray irradiation or energy ray irradiation and heating of the composition for forming the functional polymer membrane and heating is preferably carried out on the membrane formed by the energy ray irradiation.

Hereinafter, an example of the method for producing the functional polymer membrane of the invention will be described in detail.

The functional polymer membrane of the invention can be produced by using a fixed support in a batch manner (batch method), and the membrane can be produced by using a moving support in a continuous manner (continuous method). The support may be a roll shape to be continuously rewound. Further, in the case of continuous method, a process for forming the membrane may be continuously performed by placing the support on the belt to be moved continuously, continuously coating the coating liquid which is a composition for forming the functional polymer membrane, and polymerization-curing the coating liquid. However, only one of the coating process and the membrane forming step may be continuously carried out.

In addition, a temporary support (the membrane may be peeled off from the temporary support after polymerization-curing reaction) may be used after the composition for forming the functional polymer membrane of the invention is applied and/or impregnated into the porous support and until the polymerization-curing reaction is completed, separately from the support.

It is not necessary to consider the substance permeation of such a temporary support. For example, any of a polyethylene terephthalate (PET) film or a metal plate such as an aluminum plate or the like may be used, as long as they can be fixed to the film formation.

Further, polymerization-curing may be performed without using a support other than the porous support onto which the composition for forming the functional polymer membrane of the invention is applied and/or impregnated.

The composition for forming the functional polymer membrane of the invention may be applied and/or impregnated onto a porous support by various methods, for example, curtain coating, extrusion coating, air-knife coating, slide coating, nip roll coating, forward roll coating, reverse roll coating, dip coating, kiss coating, rod bar coating, or spray coating. Applying of a plurality of layers can be carried out simultaneously or continuously. To conduct simultaneous multilayer coating, curtain coating, slide coating, slot die coating, and extrusion coating are preferred.

Production of a functional polymer membrane in a continuous system is carried out by continuously applying the composition for forming the functional polymer membrane onto a moving support, more preferably using a production unit which includes a coating part of the composition for forming the functional polymer membrane; a radiation source for polymerization-curing the composition for forming the functional polymer membrane; a membrane winding part for collecting a formed membrane; and means for moving a support from the coating part of the composition for forming the functional polymer membrane to the radiation source and the membrane winding part.

In the present Production Example, the functional polymer membrane of the invention is produced by a process of (i) applying and/or impregnating the composition for forming the functional polymer membrane of the invention onto a porous support, and (ii) subjecting the composition for forming the functional polymer membrane to a polymerization-curing reaction by energy ray irradiation, as necessary, by the further heating in addition to this, and (iii) removing the membrane from the support, as desired.

In the (ii), the heating may be performed before the energy ray irradiation, may be performed simultaneously with an energy ray irradiation, and may be performed after formation of the membrane with the energy ray irradiation. Furthermore, the (ii) may be a polymerization-curing reaction by heating, and a polymerization-curing reaction by energy ray irradiation is preferred.

The time required for the polymerization-curing reaction is not particularly limited, but is preferably 10 minutes or shorter, more preferably 6 minutes, and particularly preferably 2 minutes or shorter. The lower limit of the time is not particularly limited, but 30 seconds or longer is practical.

[Polymerization-Curing by Heating]

(1) In the Case of Heating Before the Energy Ray Irradiation

The heating temperature is preferably 40° C. to 120° C., more preferably 50° C. to 100° C., and particularly preferably 60° C. to 90° C.

The heating time is preferably from 10 seconds to 6 hours, more preferably from 10 seconds to 3 hours, and particularly preferably from 10 seconds to 1 hour.

(2) In the Case of Heating with the Energy Ray Irradiation Simultaneously

The heating temperature is preferably 40° C. to 120° C., more preferably 50° C. to 100° C., and particularly preferably 60° C. to 90° C. The heating time is not particularly limited, but the heating time may be equal to or longer than the total time of the time period which the porous support containing the composition for forming the functional polymer membrane reaches the overheating temperature and the time period for irradiating with energy ray after that time.

(3) In the Case of Heating after Energy Ray Irradiation

The heating temperature is preferably 40° C. to 120° C., more preferably 50° C. to 100° C., and particularly preferably 60° C. to 90° C.

The heating time is preferably from 1 minute to 12 hours, more preferably from 1 minute to 8 hours, and particularly preferably from 1 minute to 6 hours.

(4) In the Case of Performing Polymerization-Curing Reaction by Heating without Energy Irradiation The heating temperature is preferably 40° C. to 95° C., more preferably 50° C. to 85° C., and particularly preferably 60° C. to 80° C.

The heating time is preferably from 1 minute to 48 hours, more preferably from 1 minute to 12 hours, and particularly preferably from 1 minute to 4 hours.

[Energy Ray Irradiation]

In the producing unit, the application part of the composition for forming the functional polymer membrane is provided in a position upstream relative to the irradiation source, and the radiation source is placed in a position upstream relative to the collecting part.

In order to have fluidity that is sufficient for applying the composition for forming the functional polymer membrane of the invention with a high-speed coating machine, the viscosity of the composition at 35° C. is preferably less than 4,000 mPa·s, more preferably 1 mPa·s to 1,000 mPa·s, and most preferably 1 mPa·s to 500 mPa·s. In the case of a slide bead coating, the viscosity at 35° C. is preferably 1 mPa·s to 100 mPa·s.

In the high-speed coating machine, a coating solution which is a composition for forming the functional polymer membrane of the invention can be applied on the support which is moving at speed of higher than 15 m/minute, for example, at speed of higher than 20 m/minute or more, and can be applied at speed of higher than 400 m/minute.

Especially in the case of using a support in order to increase the mechanical intensity, before applying the composition for forming the functional polymer membrane of the invention onto the surface of the support, for example, the support may be subjected to a corona discharge treatment, a glow discharge treatment, a flame treatment, and an ultraviolet irradiation treatment to improve wettability and adhesive force of the support During polymerization-curing reaction, a (A) styrene-based monomer represented by Formula (HSM) and a (B) crosslinking agent represented by Formula (CL) are polymerized to form a polymer. Polymerization-curing reaction can be carried out by energy ray irradiation and heating under the conditions that the polymerization-curing occurs at a sufficient rapidity to form a membrane within 5 minutes.

In polymerization-curing of the composition for forming the functional polymer membrane of the invention, the composition for forming the functional polymer membrane is applied or impregnated onto a support, and then the polymerization-curing reaction is initiated preferably within 60 seconds, more preferably within 15 seconds, particularly preferably within 5 seconds, and most preferably within 3 seconds.

Energy ray irradiation during polymerization-curing is preferably shorter than 10 minutes, more preferably shorter than 5 minutes, particularly preferably shorter than 3 minutes, and most preferably shorter than 1 minute. In a continuous method, irradiation is performed continuously, and the polymerization-curing reaction time is determined by taking into account the speed at which the composition for forming the functional polymer membrane moves passing through the irradiation beam.

In a case in which ultraviolet radiation (UV light) with high intensity is used for the polymerization-curing reaction, a significant amount of heat may be generated. Thus, in order to prevent overheating, it is preferable that the lamp of the light source and/or the support/membrane is cooled with cooling air or the like. In the case where a significant dose of infrared light (IR light) is radiated together with a UV beam, UV light is radiated through a filter of an IR-reflective quartz plate.

It is preferable to use ultraviolet radiation for the polymerization-curing reaction. A suitable wavelength is preferably such that the absorption wavelength of an arbitrary photopolymerization initiator included in the composition for forming the functional polymer membrane matches the wavelength, and examples thereof include UV-A (400 nm to 320 nm), UV-B (320 nm to 280 nm), and UV-C (280 nm to 200 nm).

Suitable examples of an ultraviolet radiation source include a mercury arc lamp, a carbon arc lamp, a low-pressure mercury lamp, a medium-pressure mercury lamp, a high-pressure mercury lamp, a swirl flow plasma arc lamp, a metal halide lamp, a xenon lamp, a tungsten lamp, a halogen lamp, a laser, and an ultraviolet-emitting diode. A medium-pressure or high-pressure mercury vapor type ultraviolet-emitting lamp is particularly preferred. In addition to this, in order to modify the emission spectrum of the lamp, additives such as a metal halide may be incorporated. A lamp having an emission maximum at 200 nm to 450 nm is particularly suitable.

The energy output of the radiation source is preferably 20 W/cm to 1,000 W/cm, and preferably 40 W/cm to 500 W/cm, and as long as a desired exposure dose can be realized, the energy output may be higher than this, or may be lower than this. The polymerization-curing of the membrane can be adjusted by varying the intensity of exposure. The exposure dose is preferably at least 40 mJ/cm$^2$ or more, more preferably 100 mJ/cm$^2$ to 5,000 mJ/cm$^2$, and most preferably 150 mJ/cm$^2$ to 3,000 mJ/cm$^2$, as measured using a High Energy UV Radiometer (UV POWER PUCK™ available from EIT-Instrument Markets, Inc.) in the UV-A range indicated in the apparatus. The exposure time can be freely selected. Meanwhile, a shorter exposure time is more preferred, and the exposure time is particularly preferably shorter than 1 minute.

Meanwhile, in a case where the coating speed is fast, plural light sources may be used in order to obtain the required exposure dose. In this case, the exposure intensities of the plural light sources may be identical or different.

Here, in the case where R$^3$ for Formula (HSM) is a halogen atom, after polymerization-curing reaction of the composition for forming the functional polymer membrane, a tertiary amine compound represented by Formula (AA) which is a quaternary ammonium agent is reacted.

<<Use of Functional Polymer Membrane>>

The functional polymer membrane of the invention can be used as anion-exchange membrane in electrodeionization, continuous electrodeionization, electrodialysis, reverse electrodialysis, gas separation, and the like. Moreover, the membrane can be used not only in general use, but also in medical applications. Recently the membrane has also been used in a solid polymer electrolyte type fuel cell.

EXAMPLES

Hereinafter, the invention will be explained in more detail by way of Examples; however, the invention is not intended to be limited to these Examples. Meanwhile, unless particularly stated otherwise, the units "parts" and "percent (%)" are on a mass basis.

[Synthesis of a (B) Crosslinking Agent Represented by Formula (CL)]

(Synthesis of Exemplified Compound (CL-1))

1,4-diazabicyclo[2.2.2] octane (1.00 mol, Wako pure Chemical Industries, Ltd.) was added to a mixed solution of 321 g of chloromethyl styrene (2.10 mol, manufactured by AGC Seimi Chemical Co., Ltd., trade name: CMS-P), 1.30 g of 2,6-di-t-butyl-4-methylphenol (manufactured by Wako Pure Chemical Industries, Ltd.) and 433 g of acetonitrile, and the mixture was stirred and heated at 80° C. for 15 hours.

The resulting crystals were filtered to give 405 g of white crystals of the exemplified compound (CL-1) (97% yield).

Example 1

(Production of Anion-Exchange Membrane)

A coating liquid of a composition for forming the functional polymer membrane having the composition (unit: g) indicated in the following Table 1 was applied on an aluminum plate using a wire-wound bar with a thickness of 150 μm, manually at a rate of about 5 m/min. Subsequently, the nonwoven fabric (manufactured by Freudenberg Co., FO-2223-10, a thickness of 100 μm) was impregnated with the coating liquid. Excess coating liquid was removed using a rod that was not wound with a wire. The temperature of the coating liquid at the time of application was about 25° C.

(room temperature). Subsequently, the coating liquid-impregnated support was subjected to a polymerization-curing reaction using a UV exposure machine (manufactured by Fusion UV Systems, Inc., Model Light Hammer 10, D-bulb, conveyer speed: 9.5 m/min, and 100% intensity), and thereby an anion-exchange membrane was produced. The exposure amount was 1,000 mJ/cm$^2$ in an UV-A region. The polymerization-curing time was 60 seconds to 2,000 seconds. The exposure time was from 60 seconds to 2,000 seconds. The membrane thus obtained was removed from the aluminum plate, and was stored in a 0.1 M NaCl solution for at least 12 hours.

Examples 2 to 5 and Comparative Example 1

Each of anion-exchange membranes of Examples 2 to 5 and Comparative Example 1 was prepared in the same manner as in Example 1 except for changing the composition in the production of the anion-exchange membrane of Example 1 into the composition as described in the following Table 1.

(Performance Evaluation of Anion-Exchange Membrane)
The anion-exchange membranes prepared in Examples 1 to 5 and Comparative Example 1 were evaluated for the following items.

[Measurement of Ion Exchange Capacity]
The ion exchange capacity was measured by the method described in NAKAGAKI, Masayuki, ed., Maku-gaku Jikken-ho (Membranology Experimental Methods), p. 194, Kitami Shobo (1984) (ISBN-978-4-906126-09-5).

[Electrical Resistance of Membrane ($\Omega \cdot Cm^2$)]
Both surfaces of a membrane that had been immersed for about 2 hours in a 0.5 M aqueous NaCl solution were wiped with dry filter paper, and the membrane was inserted into a two-chamber type cell (effective membrane area: 1 cm$^2$, the electrode was an Ag/AgCl reference electrode (manufactured by Metrohm AG.)). The two chambers were each filled with 100 mL of aqueous NaCl solution with the same concentration, and the cell was placed in a constant temperature water tank at 25° C. and was left to stand until equilibrium was reached. After the liquid temperature in the cell was accurately reached 25° C., the electrical resistance $r_1$ was measured using an alternating current bridge (frequency: 1,000 Hz). NaCl concentration to be measured was 0.5 M, and was sequentially measured from the low-concentration solution. Next, the membrane was removed to leave only the 0.5 M aqueous NaCl solution, and the electrical resistance $r_2$ between the two poles was measured. Thus, the electrical resistance r of the membrane was determined as $r_1-r_2$.

In Table 1, the "electrical resistance of the membrane" is described briefly as "membrane resistance".

[Coefficient of Water Permeability (mL/m$^2$/Pa/Hr)]
The coefficient of water permeability of a membrane was measured using an apparatus having the flow channels 10 illustrated in FIG. 1. In FIG. 1, reference numeral 1 represents a membrane; reference numerals 3 and 4 represent the flow channels of a feed solution (pure water) and a draw solution (4 M NaCl), respectively. Also, the arrow of reference numeral 2 represents the flow of water separated from the feed solution.

400 mL of a feed solution and 400 mL of a draw solution were brought into contact through a membrane (membrane contact area: 18 cm$^2$), and each solution was caused to flow at a flow rate of 0.11 cm/second in the direction of the arrow of reference numeral 5 using a peristaltic pump. The rate at which water from the feed solution permeates into the draw solution through the membrane was analyzed by measuring the masses of the feed solution and the draw solution in real time, and thus the coefficient of water permeability was determined.

The results obtained are summarized in the following Table 1.

Here, the materials used in Table 1 are shown in the following abbreviation. Further, in the following Table 1, the time required for the polymerization-curing reaction is described as "Time required for curing".

[Materials Used and their Abbreviations]
(Styrene-Based Monomer Represented by the Formula (HSM))
VBTMAC: an exemplified compound SM-1 of (A), vinylbenzyl trimethyl ammonium chloride (manufactured by Sigma-Aldrich Co. LLC.)
(Crosslinking Agent Represented by Formula (CL))
CL-1: an exemplified compound CL-1 of (B)
(C) Chain Transfer Agent
Bifunctional thiol: dithioerythritol (manufactured by Tokyo Chemical Industry Co., Ltd.)
Trifunctional thiol: bis(3-mercaptopropionic acid) ethylene glycol (manufactured by Wako Pure Chemical Industries, Ltd.)
Tetrafunctional thiol: pentaerythritol tetra(3-mercaptopropionate) (manufactured by Tokyo Chemical Industry Co., Ltd.)
Hexafunctional thiol: hexakis(3-mercaptopropionic acid) dipentaerythritol (manufactured by Wako Pure Chemical Industries, Ltd.)
(D) Polymerization Initiator
Irgacure 2959 (trade name, manufactured by BASF Japan Ltd.), Exemplified Compound PI-1-2
(G) Polymerization Inhibitor
4OH TEMPO: 4-hydroxy-2,2,6,6-tetramethylpiperidin-1-oxyl (manufactured by Tokyo Chemical Industry Co., Ltd.)

TABLE 1

|  | Example 1 | Example 2 | Example 3 | Example 4 | Example 5 | Comparative Example 1 |
|---|---|---|---|---|---|---|
| VBTMAC | 17.3 | 18.3 | 18.8 | 18.8 | 18.8 | 19.3 |
| CL-1 | 50.0 | 50.0 | 50.0 | 50.0 | 50.0 | 50.0 |
| Water | 30.0 | 30.0 | 30.0 | 30.0 | 30.0 | 30.0 |
| 4OH TEMPO | 0.030 | 0.030 | 0.030 | 0.030 | 0.030 | 0.030 |
| Irgacure 2959 | 0.7 | 0.7 | 0.7 | 0.7 | 0.7 | 0.7 |
| Bifunctional thiol | 2.0 | 1.0 |  |  |  |  |
| Trifunctional thiol |  |  | 0.5 |  |  |  |
| Tetrafunctional thiol |  |  |  | 0.5 |  |  |
| Hexafunctional thiol |  |  |  |  | 0.5 |  |
| Total (g) | 100 | 100 | 100 | 100 | 100 | 100 |

TABLE 1-continued

|  | Example 1 | Example 2 | Example 3 | Example 4 | Example 5 | Comparative Example 1 |
|---|---|---|---|---|---|---|
| Curing method | UV irradiation | UV irradiation | UV irradiation | UV irradiation | UV irradiation | UV irradiation |
| Ionization Step | none | none | none | none | none | none |
| Time required for curing (min) | 1 | 1 | 1 | 1 | 1 | 5 |
| Ion exchange capacity (meq/g) | 3.2 | 3.3 | 3.1 | 3.1 | 3.1 | 3.2 |
| Membrane resistance ($\Omega \cdot cm^2$) | 1.70 | 1.50 | 1.70 | 1.72 | 1.75 | 1.50 |
| Coefficient of water permeability × $10^5$ (mL/m²/Pa/hr) | 2.80 | 3.50 | 2.96 | 3.02 | 2.96 | 4.10 |
| Membrane resistance × Coefficient of water permeability × $10^5$ | 4.76 | 5.25 | 5.03 | 5.19 | 5.18 | 6.15 |

As is obvious from Table 1, it is understood that Examples 1 to 5 of the functional polymer membranes of the invention which have a structure represented by Formula (1) and a structure represented by Formula (2) have lower values of the product of the coefficient of water permeability and the electrical resistance of the membrane, compared to Comparative example 1 of the functional polymer membrane which has a structure represented by Formula (2), but does not have a structure represented by Formula (1).

From these results, the value of the product of the coefficient of water permeability and the electrical resistance of the membrane may be reduced by using a polyfunctional mercapto compound represented by Formula (3).

Further, it is understood that in Examples 1 to 4, the time required for polymerization-curing is shortened to ⅕, compared to Comparative Example 1.

Having described the invention as related to the present embodiments, it is our intention that the invention should not be limited by any of the details of the description, unless otherwise specified, but rather should be construed broadly within its spirit and scope as disclosed in the accompanying claims.

EXPLANATION OF REFERENCES

1: membrane
2: arrow indicating the permeation of water in feed solution into draw solution through membrane
3: flow channel of feed solution
4: flow channel of draw solution
5: direction of movement of liquid
10: flow channels of apparatus for measuring coefficient of water permeability

What is claimed is:

1. A functional polymer membrane comprising:
a structure represented by the following Formula (1); and
a structure represented by the following Formula (2), wherein an ion exchange capacity is 2.0 meq/g to 7.0 meq/g,

Formula (1)

in Formula (1), LL represents a single bond or an alkylene group which may have a substituent, —O—, —S—, —NR$^Z$— or a linking group obtained by combining these, LL$^1$ and LL$^2$ each independently represent —(CR$^1$R$^2$)$_l$— or —(CR$^1$R$^2$)$_l$—C(=O)O— (in which the atom bonded to LL is an oxygen atom), R$^1$ and R$^2$ each independently represent a hydrogen atom or an alkyl group, l represents 1 or 2, and R$^Z$ represents a hydrogen atom or a substituent, however, in a case where terminal atoms of a substituent in LL and a substituent of R$^Z$ are a sulfur atom, LL is the sulfur atom having a bond to be incorporated into the polymer chain, and

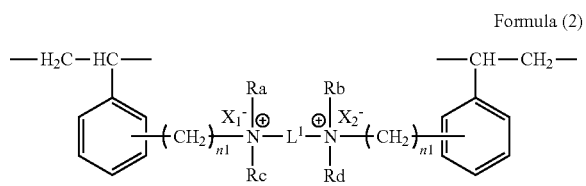

Formula (2)

in Formula (2), L$^1$ represents an alkylene group or an alkenylene group, Ra, Rb, Rc, and Rd each independently represent an alkyl group or an aryl group, Ra and Rb, or/and Rc and Rd may be bonded to each other to form a ring, n1 represents an integer of 1 to 10, and X$_1^-$ and X$_2^-$ each independently represent an organic or inorganic anion.

2. The functional polymer membrane according to claim 1, wherein the content of the structure section represented by Formula (1) is 0.01 parts by mass to 10 parts by mass with respect to a total 100 parts by mass of the functional polymer membrane.

3. The functional polymer membrane according to claim 1 obtained by conducting polymerization-curing reaction of the composition containing a (A) styrene-based monomer represented by the following Formula (HSM), a (B) cross-linking agent represented by the following Formula (CL), and a (C) chain transfer agent represented by the following Formula (3),

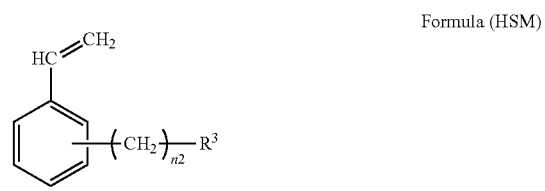

Formula (HSM)

in Formula (HSM), R$^3$ represents a halogen atom or —N$^+$(R$^4$)(R$^5$)(R$^6$)(X$_3^-$), and n2 represents an integer of 1 to 10, where R$^4$ to R$^6$ each independently represent a linear or branched alkyl group or aryl group, R$^4$ and $R^5$, or $R^4$, $R^5$, and $R^6$ may be bonded to one another to form an aliphatic hetero ring, and $X_3^-$ represents an organic or inorganic anion, Formula (CL)

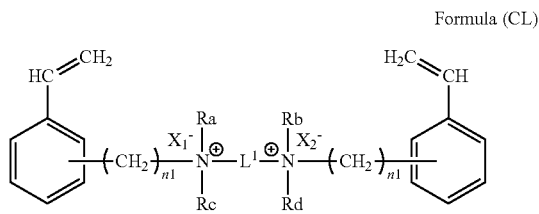

in Formula (CL), $L^1$ represents an alkylene group or an alkenylene group, Ra, Rb, Rc, and Rd each independently represent an alkyl group or an aryl group, Ra and Rb, or/and Rc and Rd may be bonded to each other to form a ring, n1 represents an integer of 1 to 10, and $X_1^-$ and $X_2^-$ each independently represent an organic or inorganic anion, and H—S-LL$^1$-LL$^a$-LL$^2$-S—H    Formula (3)

in Formula (3), LL$^a$ represent a single bond or an alkylene group which may have a substituent, —O—, —S—, —NR$^{Za}$—, or a linking group obtained by combining these, LL$^1$ and LL$^2$ each independently represent —(CR$^1$R$^2$)$_l$— or —(CR$^1$R$^2$)$_l$—C(=O)O— (in which the atom bonded to LL$^a$ is an oxygen atom), $R^1$ and $R^2$ each independently represent a hydrogen atom or an alkyl group, l represents 1 or 2, $R^{Za}$ represents a hydrogen atom or a substituent, however, in a case where terminal atoms of a substituent in LL$^a$ and a substituent of $R^{Za}$ are a sulfur atom, LL$^a$ is SH.

4. The functional polymer membrane according to claim 3, wherein the composition further contains a (D) polymerization initiator represented by the following Formula (PI-1) or (PI-2), Formula (PI-1)

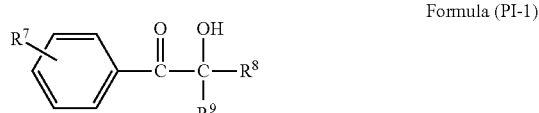

Formula (PI-2)

in Formula (PI-1), $R^7$ represents a hydrogen atom, an alkyl group, an alkenyl group, an alkoxy group, or an aryloxy group, $R^8$ and $R^9$ each independently represent a hydrogen atom, an alkyl group, an alkenyl group, an alkoxy group, or an aryloxy group, and $R^8$ and $R^9$ may be bonded to each other to form a ring, and in Formula (PI-2), $R^{10}$ represents an alkyl group, an aryl group, an alkylthio group, or an arylthio group, $R^{11}$ represents an alkyl group, an aryl group, an alkylthio group, an arylthio group, or an acyl group, and $R^{12}$ represents an alkyl group or an aryl group.

5. The functional polymer membrane according to claim 3, wherein the content of the (A) styrene-based monomer represented by Formula (HSM) is 1 part by mass to 85 parts by mass with respect to 100 parts by mass of the total solid content of the composition.

6. The functional polymer membrane according to claim 3, wherein the content of the (B) crosslinking agent represented by Formula (CL) is 10 parts by mass to 100 parts by mass with respect to 100 parts by mass of the total solid content of the composition.

7. The functional polymer membrane according to claim 3, wherein the content of the (C) chain transfer agent represented by Formula (3) is 0.01 parts by mass to 10 parts by mass with respect to 100 parts by mass of the total solid content of the composition.

8. The functional polymer membrane according to claim 3, wherein the composition contains a (F) solvent.

9. The functional polymer membrane according to claim 8, wherein the (F) solvent is water or a water-soluble solvent.

10. The functional polymer membrane according to claim 3, wherein the polymerization-curing reaction is conducted by heating and/or energy ray irradiation.

11. The functional polymer membrane according to claim 1, further comprising synthetic woven fabric, synthetic nonwoven fabric, a sponge-like film or a film-like support having fine through-holes.

12. A method for producing a functional polymer membrane comprising: conducting polymerization-curing reaction of a composition containing a (A) styrene-based monomer represented by the following Formula (HSM), a (B) crosslinking agent represented by the following Formula (CL) and a (C) chain transfer agent represented by the following Formula (3), wherein the ion exchange capacity of the functional polymer membrane is 2.0 meq/g to 7.0 meq/g, Formula (HSM)

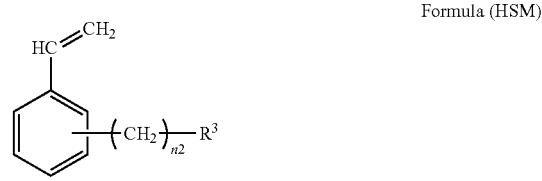

in Formula (HSM), $R^3$ represents a halogen atom or —N$^+$(R$^4$)(R$^5$)(R$^6$)(X$_3^-$), and n2 represents an integer of 1 to 10, where $R^4$ to $R^6$ each independently represent a linear or branched alkyl group or aryl group, $R^4$ and $R^5$, or $R^4$, $R^5$, and $R^6$ may be bonded to one another to form an aliphatic hetero ring, and $X_3^-$ represents an organic or inorganic anion, Formula (CL)

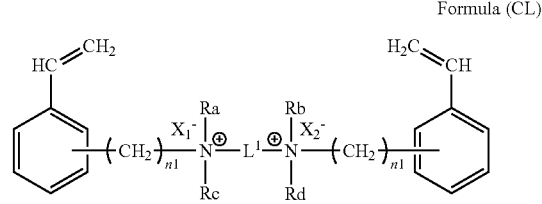

in Formula (CL), $L^1$ represents an alkylene group or an alkenylene group, Ra, Rb, Rc, and Rd each independently represent an alkyl group or an aryl group, Ra and Rb, or/and Rc and Rd may be bonded to each other to form a ring, n1 represents an integer of 1 to 10, $X_1^-$ and $X_2^-$ each independently represent an organic or inorganic anion, and H—S-LL$^1$-LL$^a$-LL$^2$-S—H    Formula (3)

in Formula (3), $LL^a$ represent a single bond or an alkylene group which may have a substituent, —O—, —S—, —$NR^{Za}$—, or a linking group obtained by combining these, $LL^1$ and $LL^2$ each independently represent —$(CR^1R^2)_l$— or —$(CR^1R^2)_l$—C(=O)O— (in which the atom bonded to $LL^a$ is an oxygen atom), $R^1$ and $R^2$ each independently represent a hydrogen atom or an alkyl group, l represents 1 or 2, $R^{Za}$ represents a hydrogen atom or a substituent, however, in a case where terminal atoms of a substituent in $LL^a$ and a substituent of $R^{Za}$ are a sulfur atom, $LL^a$ is SH.

* * * * *